(12) United States Patent
Horton

(10) Patent No.: US 6,824,117 B2
(45) Date of Patent: Nov. 30, 2004

(54) NON-RETURN VALVE

(75) Inventor: David R Horton, Drummoyne (AU)

(73) Assignee: IP. One Pty Ltd., Sydney (AU)

( * ) Notice: Subject to any disclaimer, the term of this patent is extended or adjusted under 35 U.S.C. 154(b) by 0 days.

(21) Appl. No.: 10/058,831

(22) Filed: Jan. 30, 2002

(65) Prior Publication Data
US 2003/0111122 A1 Jun. 19, 2003

Related U.S. Application Data

(63) Continuation-in-part of application No. 10/018,056, filed as application No. PCT/AU00/00659 on Dec. 14, 2000.

(30) Foreign Application Priority Data

Jun. 15, 1999 (AU) .................................. PQ4713
Aug. 23, 1999 (AU) .................................. PQ2387

(51) Int. Cl.[7] ............................................. F16K 15/14
(52) U.S. Cl. .................................... 251/149.1; 137/846
(58) Field of Search ........................ 251/149.1; 137/846

(56) References Cited

U.S. PATENT DOCUMENTS

| 3,822,720 A | | 7/1974 | Souza | |
|---|---|---|---|---|
| 4,240,630 A | | 12/1980 | Hoffman | |
| 4,387,879 A | * | 6/1983 | Tauschinski | ............. 251/149.1 |
| 4,426,062 A | | 1/1984 | Bowron | |
| 5,769,107 A | * | 6/1998 | Woodruff | ............. 251/149.2 X |

FOREIGN PATENT DOCUMENTS

| DE | 40 33 818 A1 | 5/1991 |
|---|---|---|
| EP | 167 274 A2 | 1/1986 |
| FR | 387 674 A | 5/1931 |
| GB | 2 298 027 A | 8/1996 |
| WO | WO 83/02320 | 7/1983 |
| WO | WO 98/01689 | 1/1998 |

* cited by examiner

Primary Examiner—Kevin Lee
(74) Attorney, Agent, or Firm—Stites & Harbison, PLLC; Ross F. Hunt, Jr.

(57) ABSTRACT

The present invention relates generally to a non-return valve (10) comprising a valve body (12) and a valve membrane (14). The valve body (12) is generally tubular and includes an elongate passageway (16) having an inlet and an outlet defined at its opposing ends (18) and (20), respectively. The valve membrane (14) is in the form of a conical-shaped diaphragm formed integral with the tubular valve body (12). The diaphragm (14) is configured as a generally conical-shaped element having a collapsible opening or aperture (22) located at or adjacent its apex. The conical diaphragm (14) is oriented with its apex in a downstream flow direction. The resiliently flexible material from which the diaphragm (14) is constructed ensures that the diaphragm (14) in a collapsed condition obstructs or closes the aperture (22) to prevent fluid flowing in a reverse direction towards the inlet (18). Pressurization of fluid within the passageway (16) on the inlet side of the diaphragm (14) deflects the diaphragm (14) to expose the aperture (22) so that fluid can flow through the passageway (16) from the inlet (18) to the outlet (20) only.

6 Claims, 22 Drawing Sheets

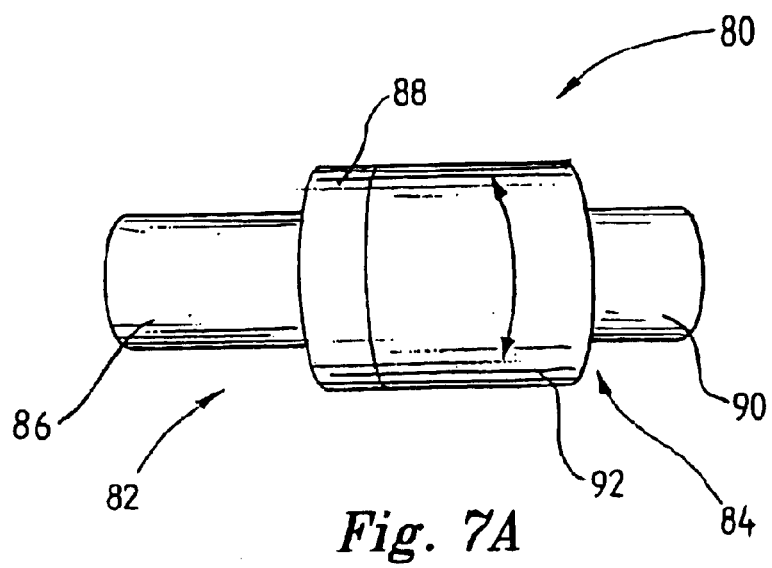
*Fig. 7A*
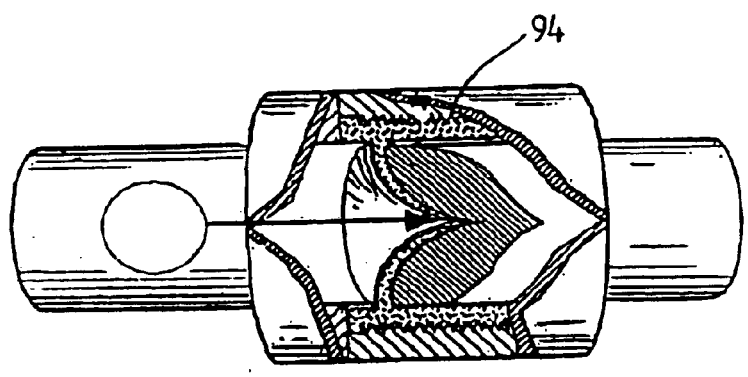
*Fig. 7B*
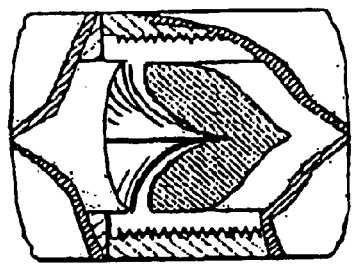 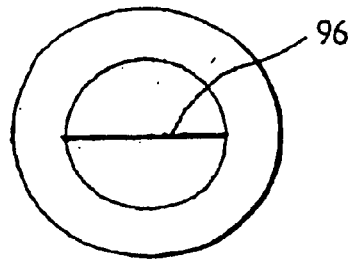
*Fig. 7C*    *Fig. 7D*

NON-RETURN VALVE

CROSS REFERENCE TO RELATED APPLICATIONS

This application is a continuation-in-part of Ser. No. 10/018,056, filed on Mar. 5, 2002, now pending, which is a 371 filing of PCT/AU00/00659, filed on Jun. 14, 2000, designing the U.S.

FIELD OF THE INVENTION

The present invention relates generally to a non-return valve such as that used on a pneumatic tyre, and a membrane being permeable in one direction only. The invention further relates to a pressure relief valve and various forms of a high pressure non-return valve.

BACKGROUND TO THE INVENTION

Non-return valves are common in industrial and domestic applications and are particularly prolific on pneumatic tyres. FIG. 1 illustrates the various components of a conventional pneumatic non-return valve 1. The valve 1 comprises an inlet casing 2 which is screw threaded within a valve stem of a tyre (not shown). The inlet casing 2 houses a shaft 3 along which a valve member 4 slidably moves. The valve member 4 is biased against a seat 5 of the casing 2 under the force of a compression spring 6 so as to close the valve 1. A spring retainer 7 is connected to an end of the shaft 3 so as to retain the compression spring 6. Pressurisation of the non-return valve 1 releases the valve member 4 from the seat 5 to allow filling of the tyre.

The conventional pneumatic non-return valve 1 suffers from at least the following problems:

i) the valve 1 has a relatively large number of components which may require periodic servicing and maintenance;

ii) the valve 1 is expensive including relatively complex machined components; and iii) the valve is complicated in operation and thus in operation may be susceptible to failure.

The patent literature includes a myriad of patent specifications relating to valves, and in particular non-return valves, of a "duck bill" configuration. For example, U.S. Pat. No. 3,822,720 describes an integral one piece valve moulded from a plastics material and including a hollow cylindrical main body within which a pair of lip members are integrally formed. The lip members are of the duck bill configuration which ordinarily are sealed together at their terminal end and open under pressure to permit flow in one direction whilst the main body may be squeezed inward to vent the valve and permit flow in an opposite direction. The valves of WO83/02320 and WO98/01689 are similarly of a duck bill configuration which is opened by an increase in pressure on an upstream or large cross sectional area of the duck bill valves. The non-return valves of this configuration are generally automatically closed by the resilient stresses in the duck bill membranes.

Although relatively simple in construction these duck bill valves of the prior art have at least the following drawbacks:

i) the valves are relatively unreliable and may leak across the aperture of the opening of the duck bill;

ii) the duck bill valve is susceptible to contamination with foreign/solid particles which may cause valve leakage; and iii) the valve is not symmetrical about its axis which may result in difficulties in tooling and moulding, and the asymmetric nature of the valve may result in leakage particularly at relatively high pressures.

SUMMARY OF THE INVENTION

According to one aspect of the present invention there is provided a non-return valve comprising:

a valve body including a fluid passageway which defines a fluid inlet and a fluid outlet located on a low pressure and a high pressure side of the valve, respectively, the fluid passageway being adapted to allow a flow of fluid from the inlet to the outlet; and a valve diaphragm in the form of a conical-shaped diaphragm having a collapsible aperture located at or adjacent its apex which is oriented in a downstream flow direction and directed toward the high pressure side of the valve, said diaphragm being connected across the fluid passageway and being constructed of a resiliently flexible material wherein the diaphragm itself initiates closure of the collapsible aperture, said closure being further promoted by fluid on the high pressure side of the valve to thus prevent fluid flowing in a reverse direction toward the inlet whereas the application of pressure, exceeding atmospheric pressure and that on the high pressure side, to an inlet side of the diaphragm deflects the diaphragm to expose the aperture and allow fluid to flow through the passageway from the inlet to the outlet only.

Typically the pressure is imposed on the inlet side of the diaphragm via a fluid nozzle which is designed to be retractably received within the passageway. Alternatively the diaphragm is deflected by fluid pressure on the low pressure side of the diaphragm which exceeds that on the high pressure side thereby exposing the collapsible aperture.

Generally the fluid is a liquid such as petrol and the non-return valve serves to prevent a reverse flow or escape of vapours.

Preferably the valve body is designed to fit to a reservoir or tank in which fluid is to be dispensed via the fluid nozzle. For example, the non-return valve is configured to fit to a petrol tank.

According to a further aspect of the present invention there is provided a non-return valve including a bank or series of non-return valves of similar construction coupled to one another, each of said non-return valves comprising:

a valve body including a fluid passageway which defines a fluid inlet and a fluid outlet, the fluid passageway being adapted to allow a flow of fluid from the inlet to the outlet; and a valve diaphragm being connected across the fluid passageway and including a collapsible aperture, the valve diaphragm being constructed of a resiliently flexible material and being configured wherein the diaphragm itself in a collapsed condition effects closure of the collapsible aperture to prevent fluid flowing in a reverse direction toward the inlet whereas pressure imposed on an inlet side of the diaphragm deflects the diaphragm to expose the aperture and allow fluid to flow through the passageway from the inlet to the outlet only.

Generally the non-return valves are coupled together with their respective valve bodies at least partly nested within one another wherein said valves are co-axially aligned. Alternatively the non-return valves are each of the same construction and configured to abut or engage one another with their valve bodies in alignment.

Preferably each of the diaphragms is formed integral with the corresponding valve body. More preferably the diaphragms are each in the form of a generally conical-shaped diaphragm having the collapsible aperture located at or adjacent its apex which is oriented in a downstream flow direction.

Generally said actuating means is a fluid nozzle which is retractably inserted into at least one of the collapsible apertures to permit a flow of fluid across the corresponding diaphragm via the fluid nozzle.

Preferably the valve diaphragm is formed integral with the valve body.

Typically the valve diaphragm is constructed of a mouldable polymeric material. More typically the polymeric material is an elastomer such as a rubber material. Alternatively the polymeric material is a nylon-based material.

Preferably the valve body is configured to retrofit to an existing valve stem. Alternatively the valve body is designed to be sealably inserted into a flow line.

Generally the fluid is water or compressed air.

According to yet a further aspect of the present invention there is provided a membrane being permeable in one direction only, said membrane comprising a panel or blanket of collapsible diaphragms each including a collapsible aperture and being constructed of a resiliently flexible material which is configured wherein each of the diaphragms themselves effects closure of the collapsible aperture to prevent fluid flowing in a reverse direction whereas pressure imposed on an upstream side of the membrane deflects one or more of the diaphragms to expose the corresponding aperture and allow fluid to flow across the membrane in said one direction only.

Generally the membrane is multi-layered with a series of said panels or blankets formed adjacent one another.

According to another aspect of the invention there is provided a non-return valve comprising:
  a valve body including a fluid passageway which defines a fluid inlet and a fluid outlet, the fluid passageway being adapted to allow a flow of fluid from the inlet to the outlet;
  a valve diaphragm being connected across the fluid passageway and including a collapsible aperture, said diaphragm being constructed of a resiliently flexible material and being configured wherein the diaphragm initiates closure of the collapsible aperture to prevent fluid flowing in a reverse direction toward the inlet; and
  a valve actuator connected to the diaphragm and being configured wherein axial movement of the actuator toward the fluid outlet deflects the diaphragm to expose the aperture and allow fluid to flow through the passageway from the inlet to the outlet only.

Preferably the diaphragm is in the form of a generally conical-shaped diaphragm having the collapsible aperture located at or adjacent its apex which is orientated in a downstream flow direction.

Preferably the valve actuator includes an elongate member formed integral and generally coaxial with the conical-shaped valve diaphragm. Alternatively the valve actuator includes an elongate member having at one end an engaging surface being configured to abut the diaphragm at its inlet side.

Preferably the valve actuator also includes a retaining element coupled to the elongate member and configured to operatively engage the valve body to inhibit axial displacement of the elongate member and its engaging surface and thus deflection of the diaphragm under pressure.

Preferably the collapsible aperture is in the form of one or more slits each being formed through an axis of the valve.

According to yet another aspect of the invention there is provided a pressure relief valve comprising:

a valve body including a fluid passageway which defines a fluid inlet and a fluid outlet located on a low pressure and a high pressure side of the valve respectively; and
  a valve diaphragm in the form of a conical-shaped diaphragm having a collapsible aperture located at or adjacent its apex which is oriented in a downstream flow direction and directed toward the high pressure side of the valve, said diaphragm being connected across the fluid passageway and being constructed of a resiliently flexible material wherein the diaphragm initiates closure of the collapsible aperture, the diaphragm being configured whereby excessive pressure on the high pressure side of the valve effects deflection of the diaphragm to expose the collapsible aperture to temporarily vent fluid from said high pressure side.

Preferably the collapsible aperture is in the form of one or more slits each being formed through an axis of the valve and its conical-shaped diaphragm.

According to still a further aspect of the invention there is provided a high pressure non-return valve comprising:
  a valve body including a fluid passageway which defines a fluid inlet and a fluid outlet located on a low pressure and a high pressure side of the valve respectively;
  a valve diaphragm being connected across the fluid passageway and including a collapsible aperture, said diaphragm being constructed of a resiliently flexible material and being configured wherein pressure imposed on the high pressure side of the valve promotes closure of the collapsible aperture to prevent fluid flowing in a reverse direction toward the inlet; and
  a reinforcing member being disposed across the valve body and designed to operatively engage the diaphragm on its low pressure side whereby the reinforcing member restricts deflection of the diaphragm when a relatively high pressure is applied on the high pressure side of the diaphragm thus maintaining closure of the collapsible aperture and the valve.

Preferably the valve diaphragm is generally conical-shaped having its apex directed to the outlet and the high pressure side of the valve.

More preferably the reinforcing member is conical-shaped and configured to nest within the fluid passageway adjacent the diaphragm on its inlet side.

In this embodiment the conical-shaped member includes a plurality of fluid openings to permit the passage of fluid.

BRIEF DESCRIPTION OF THE DRAWINGS

In order to facilitate a better understanding of the nature of the present invention several embodiments of a non-return valve, a pressure relief valve and a membrane being permeable in one direction only will now be described, by way of example only, with reference to the accompanying drawings in which:

FIG. 7 is an elevational and part cutaway view of a tool suitable for moulding of the non-return valve;

DETAILED DESCRIPTION OF THE PREFERRED EMBODIMENTS

Figure 1:
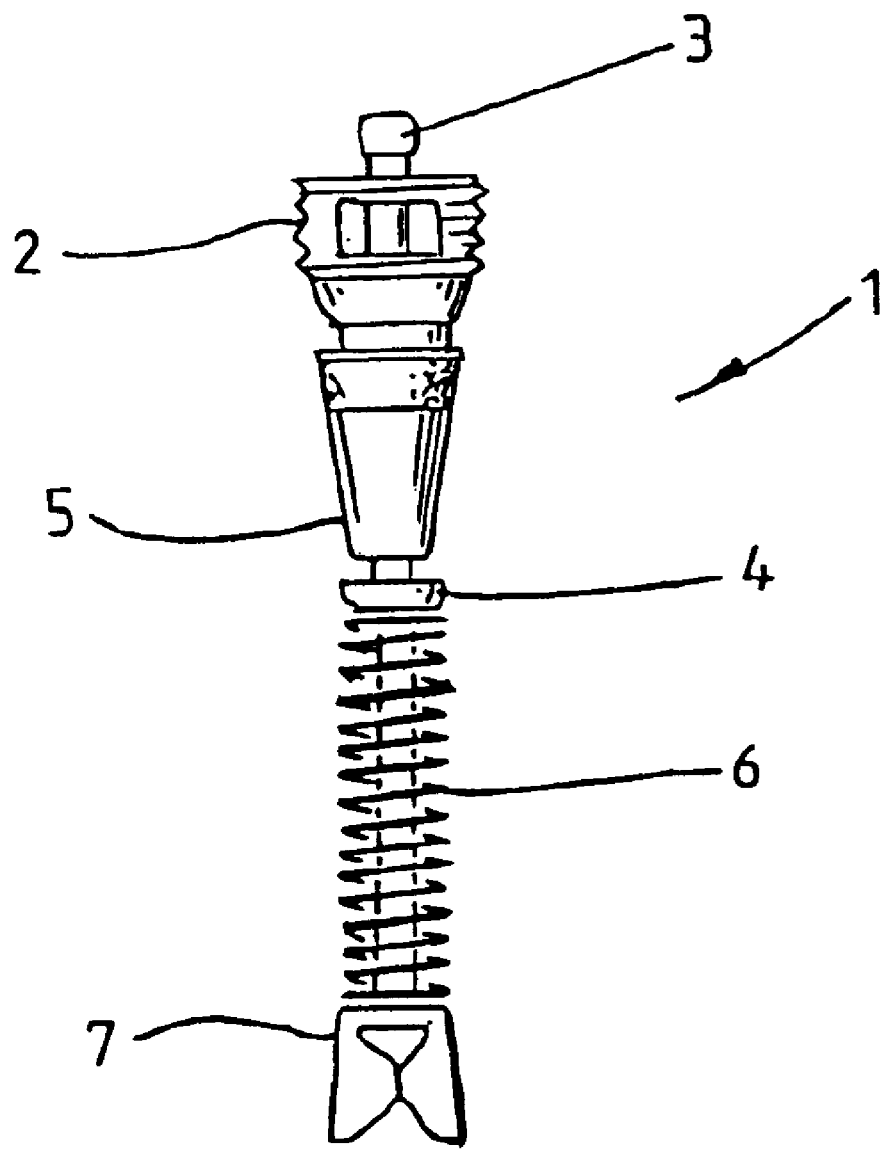
FIG. 1 is a general assembly of a conventional pneumatic non-return valve.

As shown in FIGS. 2 to 5 there are various embodiments of a non-return valve shown generally as 10 constructed in accordance with one aspect of the invention. For ease of reference and in order to avoid repetition like components have been designated with the same reference numerals.

In each example the non-return valve 10 comprises a valve body 12 and a valve membrane 14. The valve body 12 is generally tubular and includes an elongate passageway 16 having an inlet and an outlet defined at its opposing ends 18 and 20, respectively.

The non-return valve 10 of these embodiments is moulded from a polymeric material, preferably an elastomer such as rubber or a nylon-based material. The selection of the appropriate material for the valve 10 if not obvious to one skilled in the art may require a degree of trial and experimentation. The valve membrane 14 is in the form of a conical-shaped diaphragm formed integral with the tubular valve body 12. The diaphragm 14 is configured as a generally conical-shaped element having a collapsible opening or aperture 22 located at or adjacent its apex and in this example being in the form of a slit which is co-planar with a central axis of the valve 10. The conical diaphragm 14 is orientated with its apex in a downstream flow direction. The resiliently flexible material from which the diaphragm 14 is constructed ensures that the diaphragm 14 in a collapsed condition obstructs or closes the aperture or slit 22 to prevent fluid flowing in a reverse direction toward the inlet 18. On the other hand, pressurisation of fluid within the passageway 16 on the inlet side of the diaphragm 14 deflects the diaphragm 14 to expose the aperture or slit 22. Thus, with the aperture or slit 22 exposed fluid is allowed to flow through the passageway 16 from the inlet 18 to the outlet 20 only.

The symmetric diaphragm 14 provides an even distribution of stresses on opening and closure of the valve 10. This is in contrast to an asymmetric shaped diaphragm such as that present in the prior art duckbill-type valves. The stresses in the diaphragm 14 are transferred toward its apex on closure of the valve 10 and the diaphragm 14 is squeezed together to promote sealing on the application of pressure on the downstream side of the diaphragm 14. The perimeter wall of the conical diaphragm is, in axial cross-section, concave whereby this sealing closure of the valve 10 is promoted.

Figure 2A:
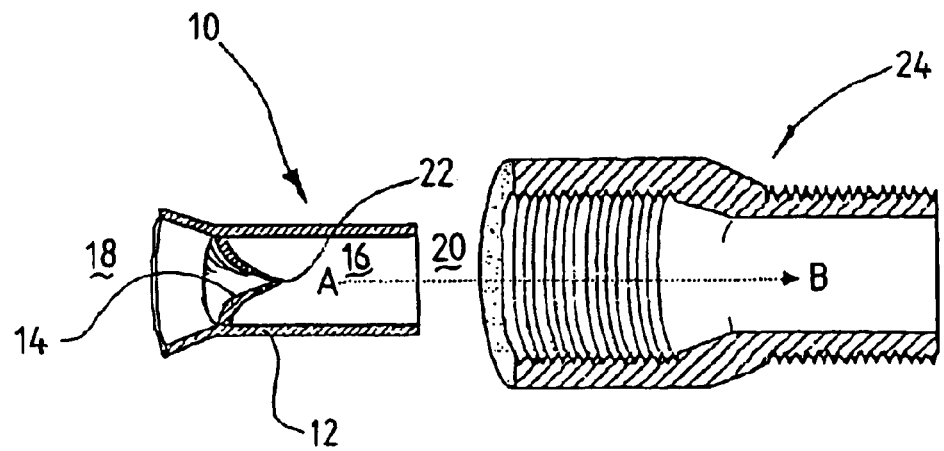
FIG. 2 illustrates three stages in the general assembly of a non-return valve according to one embodiment of the invention.
Figure 2B:
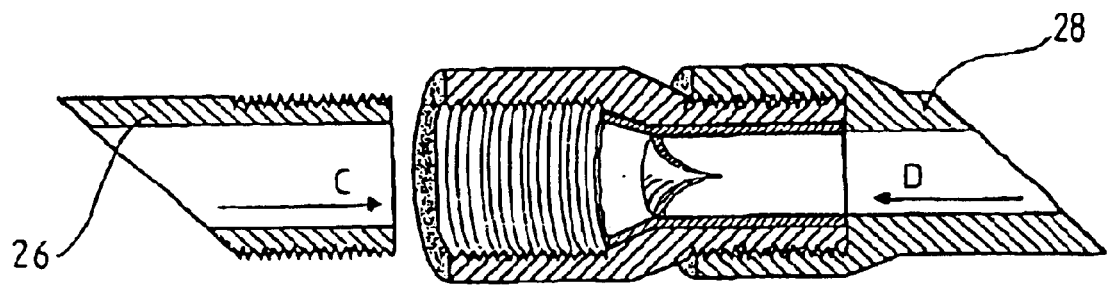
Figure 2C:
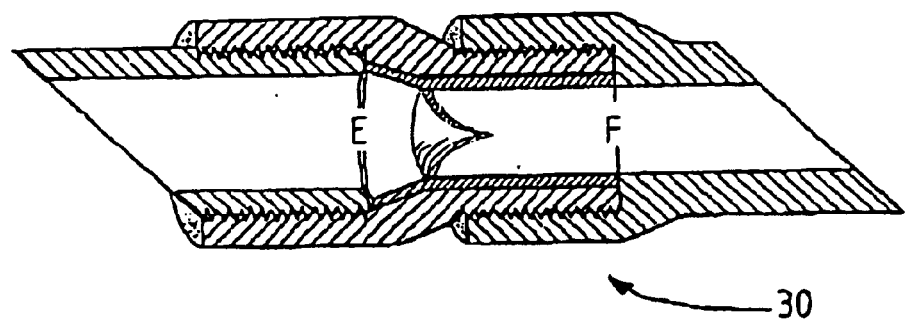

FIGS. 2 to 5 depict installation of variations on the non-return valve 10 in various applications. The non-return valve 10 of FIG. 2 is flared at its inlet 18 and is configured to seat within an internally and externally threaded nipple 24. An externally threaded conduit 26 and an internally threaded conduit 28 then threadably engage the respective male/female threaded nipple 24 so as to form a mated union shown generally as 30. The mated union 30 is designed so that sufficient compression is applied to the valve body 12 to seal it within the nipple 24. It will be appreciated that the non-return valve 10 can be adapted to suit any standard and pre-existing plumbing components such as the threaded nipple 24 and conduits 26 and 28 described.

Figure 3A:
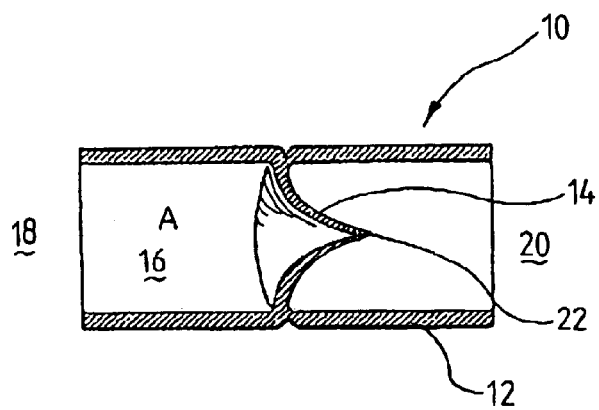
FIG. 3 is a general assembly of another embodiment of the invention suitable for use with irrigation tubing.
Figure 3C:
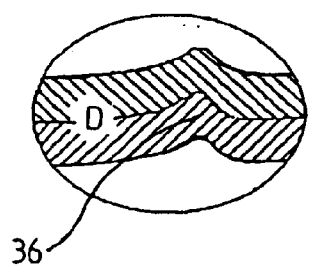
Figure 3B:
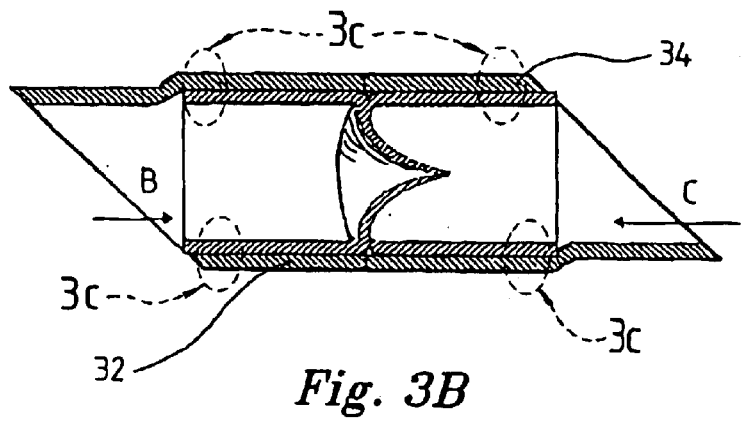

FIG. 3 shows another non-return valve 10 which in this embodiment is suitable as a "slip on union" such as that used with adjacent lengths of irrigation tubing such as 32 and 34. In this example the tubing 32 and 34 is expanded over respective ends of the tubular valve body 12. As indicated in enlarged detail one or more barbs such as 36 may be included in the valve body 12 to both provide firm engagement with and enhance the seal between the tube 32 and 34 and the valve body 12. Fitting of the polyethylene tube 32 or 34 to the valve 10 may involve heating of the tubing to improve its pliability. The tubing 32 or 34 will naturally cool under ambient conditions after it has been slipped over the valve body 12.

Figure 4A:
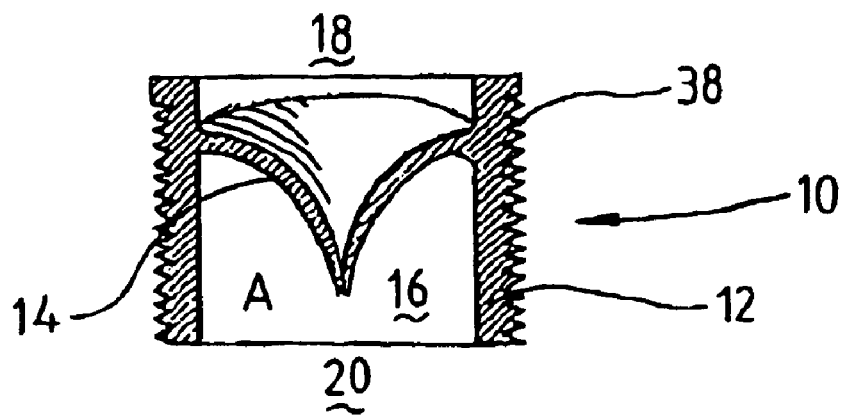
FIG. 4 is a general assembly of a further embodiment of a non-return valve of the invention suitable for use in pneumatic tyres.
Figure 4B:
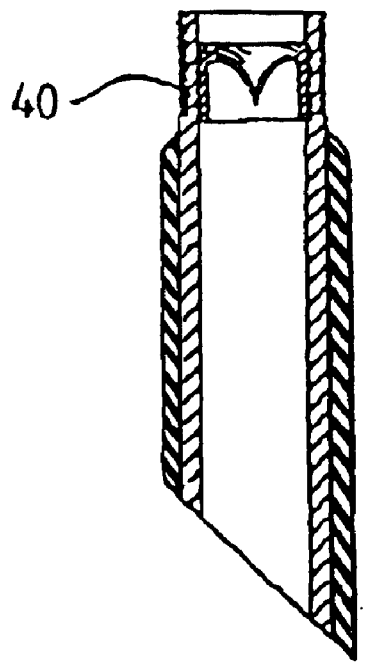

FIG. 4 shows another variant of the non-return valve 10 which may be substituted for the conventional pneumatic non-return valve 1. In this embodiment the valve body 12 is provided with an external thread 38 for securing the valve 10 within a stem 40. The stem 40 is preferably that of the conventional pneumatic non-return valve 1.

Figure 5A:
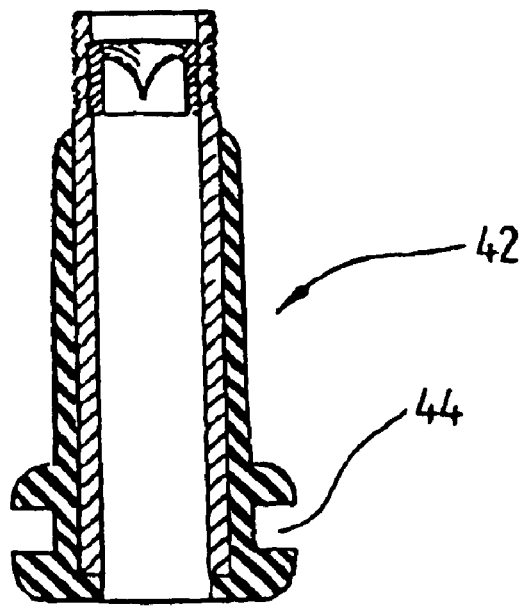
FIG. 5 is an assembly of a non-return valve of yet another embodiment of the invention suitable for tubeless pneumatic tyres.
Figure 5B:
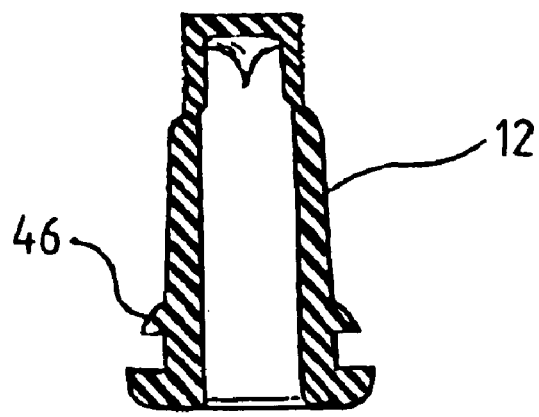

FIG. 5 shows installation of the non-return valve 10 of FIG. 4 in a pneumatic tyre of a tubeless configuration. The valve stem 40 is located in a conventionally fabricated rubber casing 42 which includes an annular channel 44 in which a wheel rim is seated. Alternatively, the rubber casing may be formed integral with the non-return valve 10. In this example the height of the rubber casing 42 or valve body 12 is reduced so that it is stiffened for insertion into the wheel rim. Furthermore, an inner lip 46 of the casing or valve body 12 is reduced in sectional size and profile so as to assist in seating of the channel 44 about the rim.

Figure 6A:
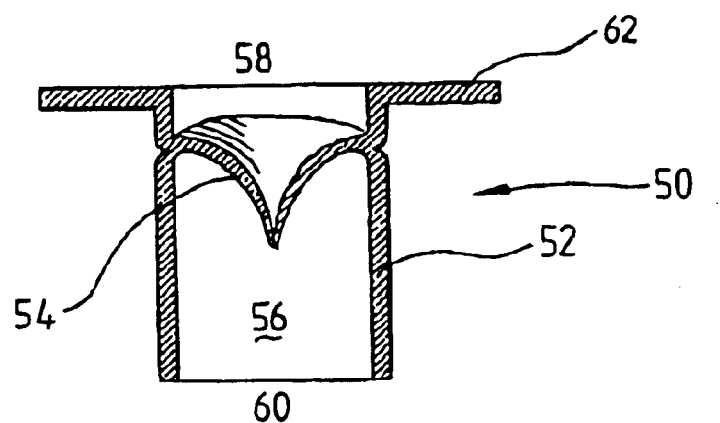
FIG. 6 is a general assembly of a non-return valve of still another embodiment of the invention.
Figure 6B:
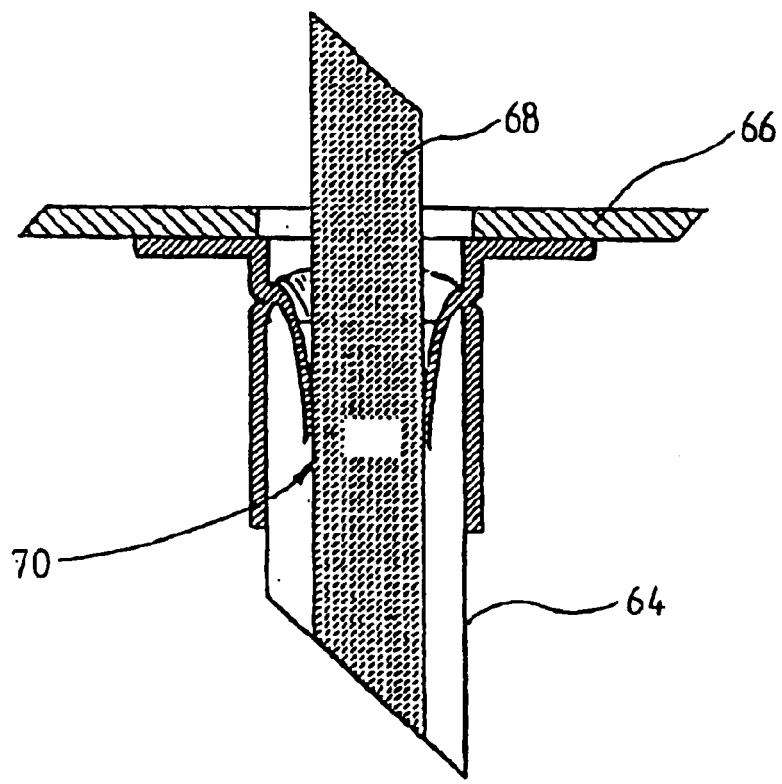

FIG. 6 illustrates one example of a non-return valve 50 according to another embodiment of the invention The non-return valve 50 is similar in construction to those described above with a tubular valve body 52 and a conical-shaped diaphragm 54. The tubular body 52 includes a passageway 56 defining an inlet and outlet 58 and 60 either side of the diaphragm 54. The diaphragm 54 is formed integral with the valve body 52 and fabricated or moulded from resiliently flexible polymeric materials.

In this particular construction of the non-return valve 50 an annular flange 62 is provided at the inlet end of the valve body 52. The valve body 52 fits about a filler tube 64 of a fuel tank and the flange 62 provides a seal against a panel 66 of a motor vehicle (not shown). In use, a filler nozzle 68 is retractably received within the valve 10 so as to deflect the diaphragm 54 to permit a flow of gasoline into the fuel tank via the nozzle 68. Thus, the diaphragm 54 is resiliently deformed so as to expose a collapsible opening or slit 70 through which the nozzle 68 passes. Importantly, the diaphragm 54 forms about the nozzle 68 to prevent the escape of gasoline vapours from the filler tube 64 or tank. When the nozzle is retracted from the valve 50 the valve membrane 54 returns to its collapsed condition wherein it obstructs or closes the collapsible opening 70. Thus, in the collapsed condition fuel vapour is prevented from escaping the tank or flowing a reversed direction toward the inlet 58.

Figure 8A:
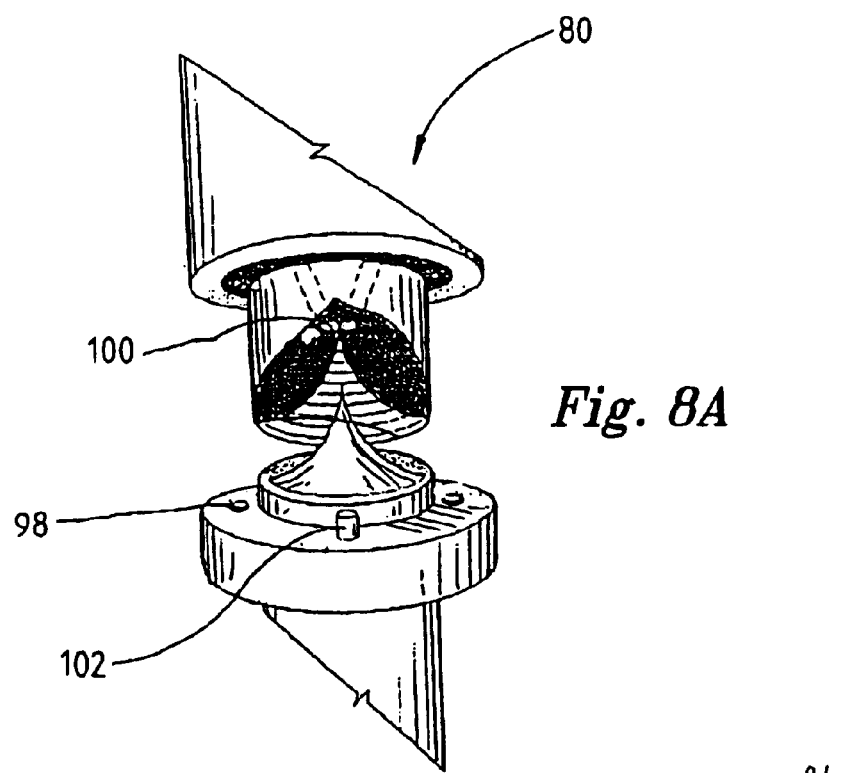
FIG. 8 is a part cutaway together with an enlarged view of the tool of FIG. 7.
Figure 8B:
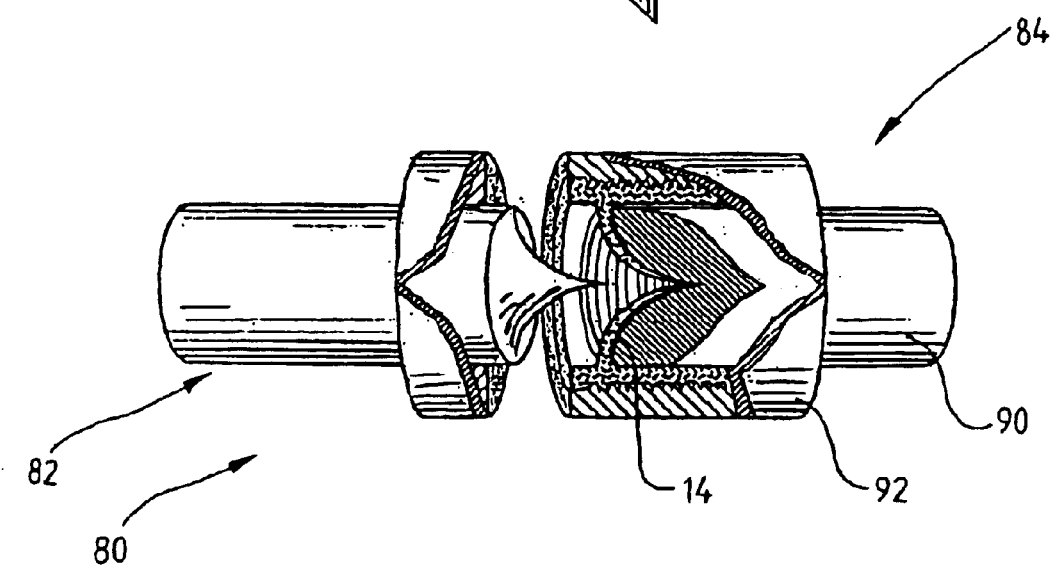
Figures 9A, 9B:
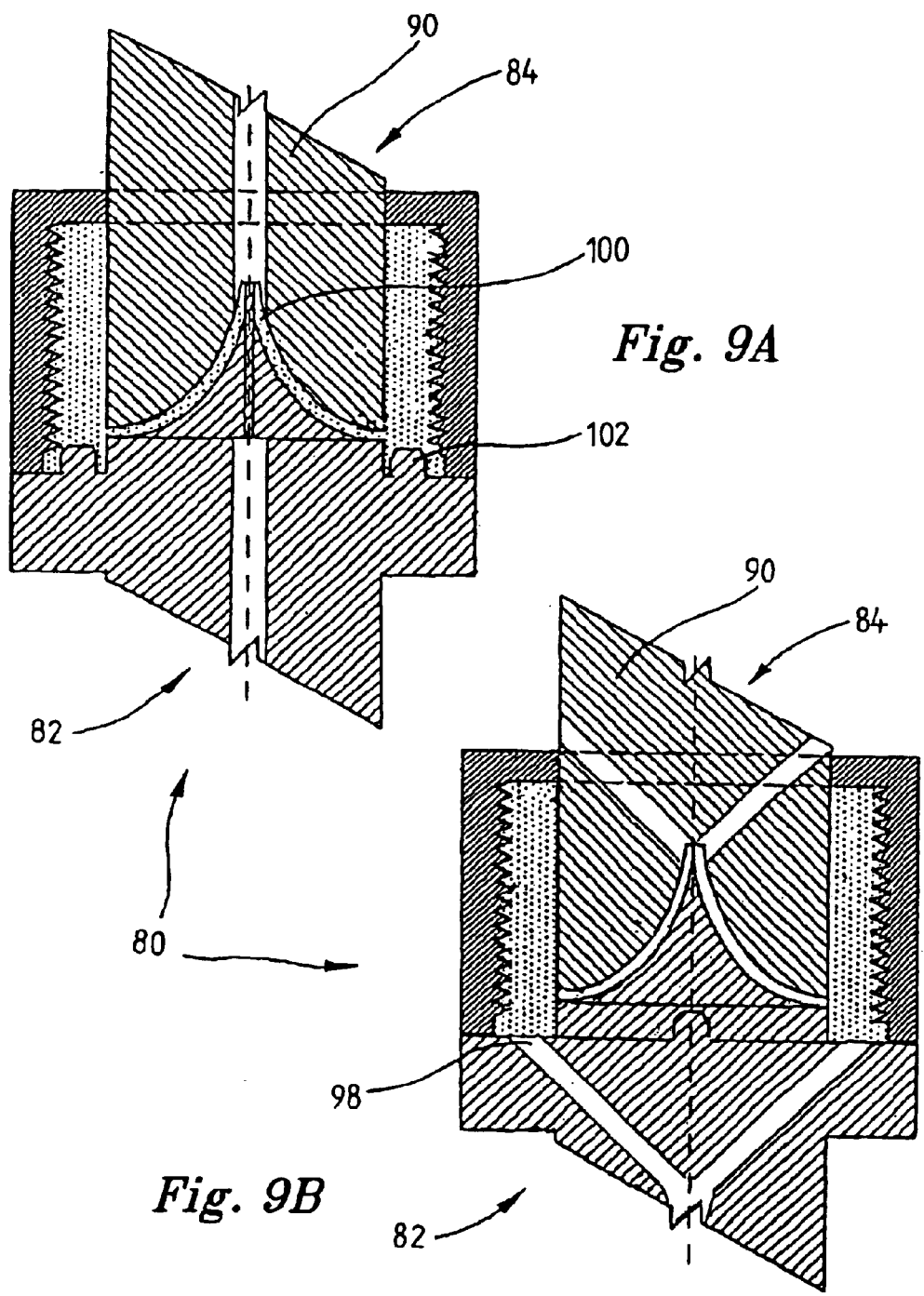
FIG. 9 is sectional views of the tool of FIGS. 7 and 8.

FIGS. 7 to 9 schematically illustrate a moulding tool which is appropriate for forming a non-return valve such as 10 described above. The tool shown generally as 80 is designed for use in a conventional injection moulding machine.

The tool 80 includes two (2) mutually engagable die sections 82 and 84. Each of the die sections 82 and 84 includes a shaft and a collar 86/88 and 90/92, respectively. The shaft 86 and collar 88 of one of the die sections 82 is machined together whereas the collar 92 is allowed to rotate on the shaft 90 of the other die section 84. This allows for removal of the tool 80 from the external thread 38 of the non-return valve 10 of this example. The part cut-away view of FIG. 7 shows in some detail the internal geometry of the tool 80 which defines an internal cavity 94 for injection of the polymeric material. Importantly, a relatively thin projection 96 is connected to the shaft 86 and extends across the apex of the resultant valve 10 co-planar with its axis. This projection 96 thus forms or defines the collapsible aperture or slit 22 of the valve 10.

The applicant has conducted prototype testing wherein the diaphragm is manually cut with a customised cutting blade. It is preferable to manually cut the diaphragm with a dual slit centred on the apex rather than a single slit. The cutting blade or tool is of a star configuration and designed to simultaneous cut the dual slits which minimises displacement of the diaphragm which may result in inaccuracies in the cut.

FIG. 8 illustrates the tool 80 of FIG. 7 in a retracted position with the die section 82 removed from the injected valve 10. The collar 92 of the other die section 84 is then rotated so as to release the injected valve 10 from the tool 80. As the injected polymer cools the membrane or diaphragm 14 is released from the shaft 90 of the other die section 84. However, the shaft 90 of the other die section 84 may also include a plunger or other means to assist or aid in removal of the injected valve 10. FIGS. 8 and 9 also depict injection and relief ports 98 and 100, respectively, which provide a flow of polymer to the die cavity 90. One of the die sections 82 or 84 may also include a dowel pin 102 for interengagement of the die sections 82 and 84. The injector ports 98 provide a discriminate point for polymer to be injected uniformly throughout the cavity 90 of the tool 80. The relief ports 100 allow an even flow and distribution of injected polymer throughout the die cavity 90.

Figure 10:
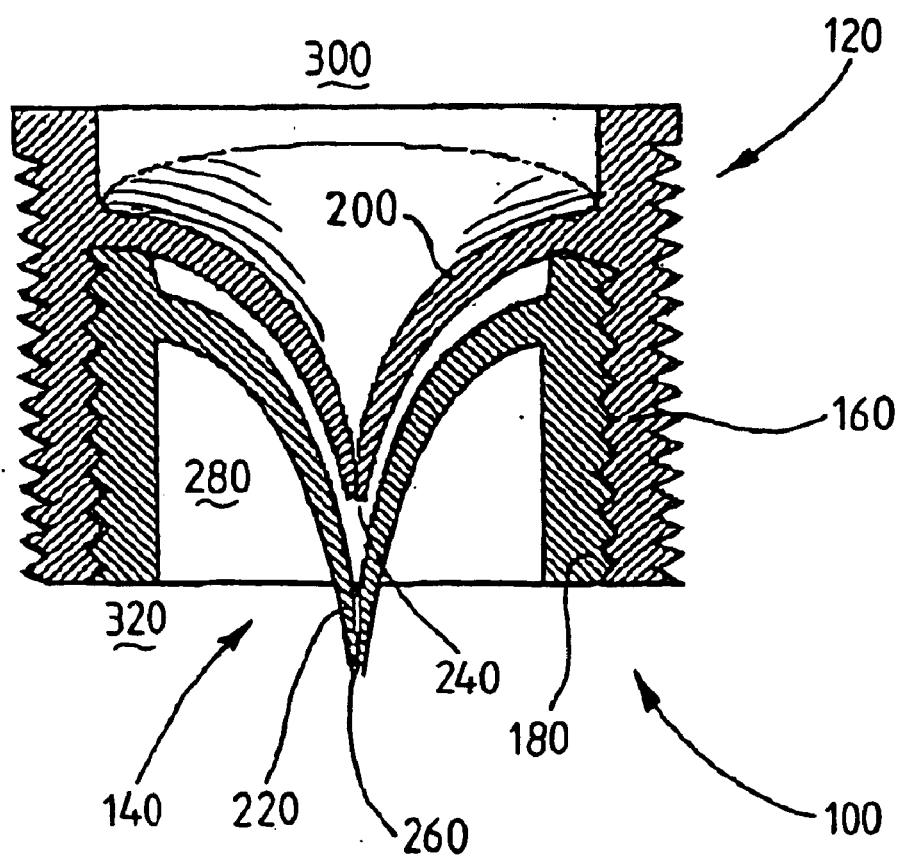
FIG. 10 illustrates an embodiment of a non-return valve according to another aspect of the invention.

As shown in FIG. 10 there is an embodiment of another aspect of a non-return valve 100 comprising a bank or series of non-return valves such as 120 and 140 of similar constructions coupled to one another. The overall non-return valve 100 is thus of a "fail safe" configuration.

In this particular construction of the fail-safe non-return valve 100 each of the series of non-return valves such as 120 and 140 includes a valve body such as 160 or 180 together with a corresponding valve membrane such as 200 or 220. The valve bodies 160 or 180 are generally tubular and moulded together with the corresponding diaphragm 200 or 220 which is configured as a generally conical-shaped element. Importantly, the diaphragm 200 or 220 includes a collapsible aperture or slit 240 or 260 formed at its apex. The conical diaphragm 200 or 220 is orientated with its apex in a downstream flow direction with the aperture or slit 240 or 260 being formed co-planar with an axis of the valve 100.

In this example the collapsible diaphragms 200 and 220 are moulded from a polymeric material, preferably an elastomer such as rubber or a nylon-based material. The particular shape of the diaphragm 200 or 220 together with the resilient material from which it is constructed ensures that the diaphragm 200 or 220 in a collapsed condition obstructs or closes the aperture or slit 240 or 260 to prevent fluid flowing in an upstream direction. On the other hand, with pressure imposed on an upstream side of either of the diaphragms 200 or 220 said diaphragm is deflected to expose the corresponding collapsible aperture or slit 240 or 260. Thus, with the collapsible apertures or slits 240 or 260 exposed fluid is allowed to flow in a downstream direction through the fail-safe non-return valve 100.

FIGS. 10 and 11 depict two configurations of the fail-safe non-return valve 100 where either two non-return valves such as 120 and 140 are nested within one another or are of substantially the same configurations and merely abut one another. In the "nested" embodiment of the fail-safe non-return valve 100 the outer body 160 of the outer valve 120 is internally threaded and designed to engage the inner body 180 of the inner valve 140. In the other embodiment, adjacent valve bodies 160 and 180 are aligned with one another and may together be housed or contained within a valve casing (not shown). In both cases the valve diaphragms such as 200 and 220 are oriented such that their respective collapsible apertures or slits 240 and 260 are aligned and coaxial with one another. An internal bore of the valve bodies 160 and 180 together defines a fluid passageway 280 of the non-return valve 100 including a fluid inlet 300 and outlet 320.

Figure 11A:
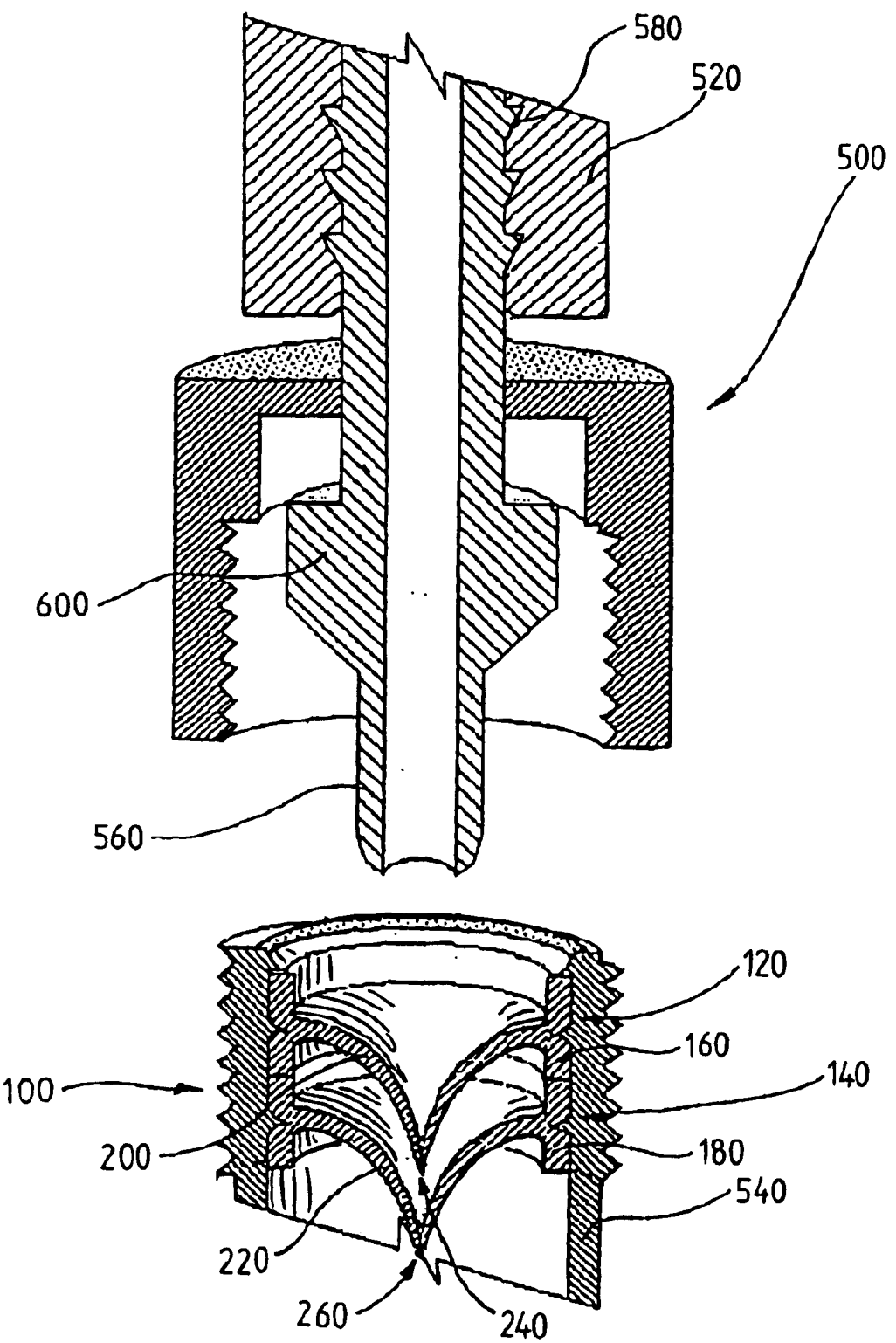
FIGS. 11A to 11C depict another embodiment of this aspect of a non-return valve incorporated in a quick connect coupling of a hydraulic line.
Figure 11B:
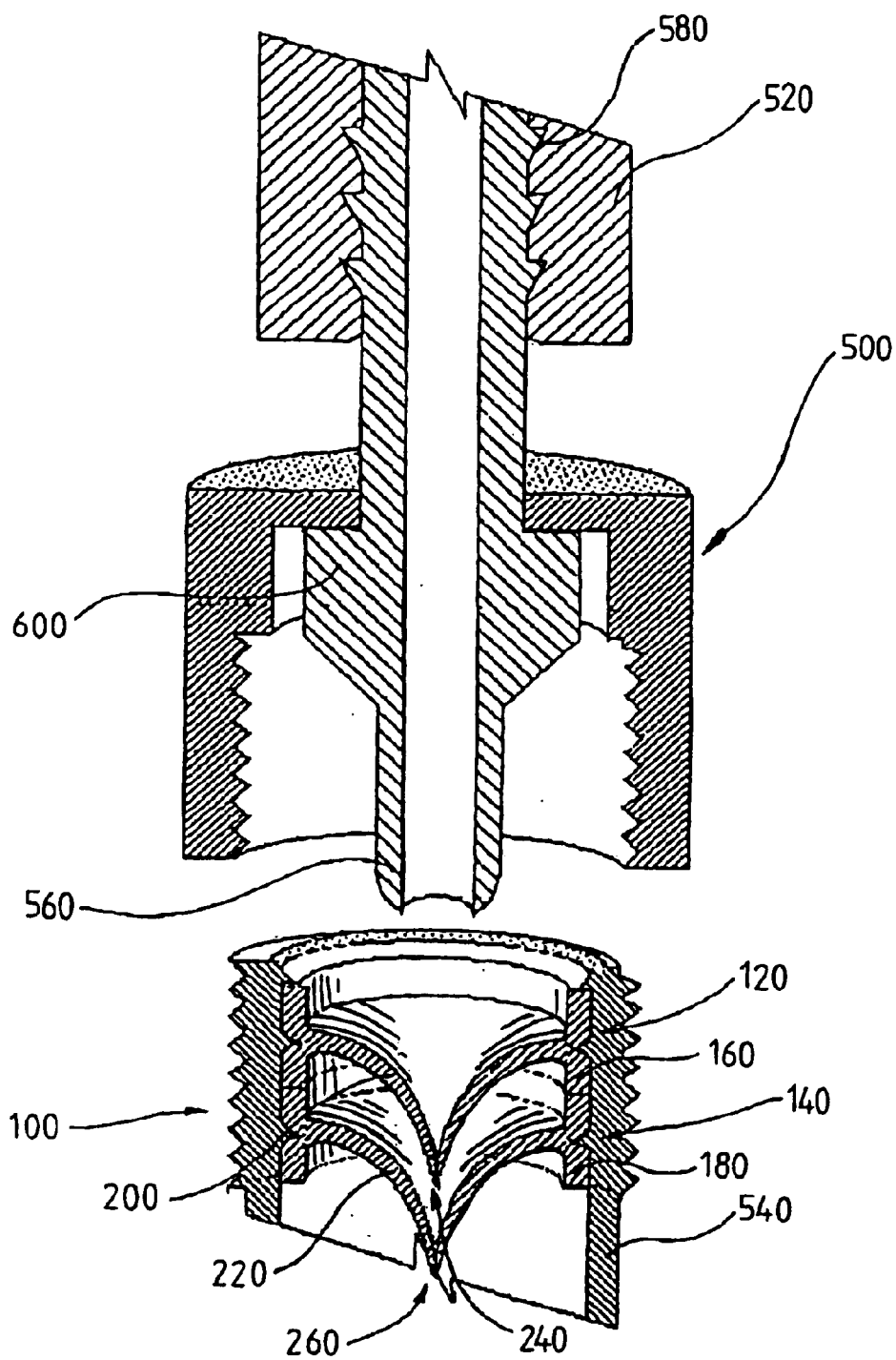
Figure 11C:
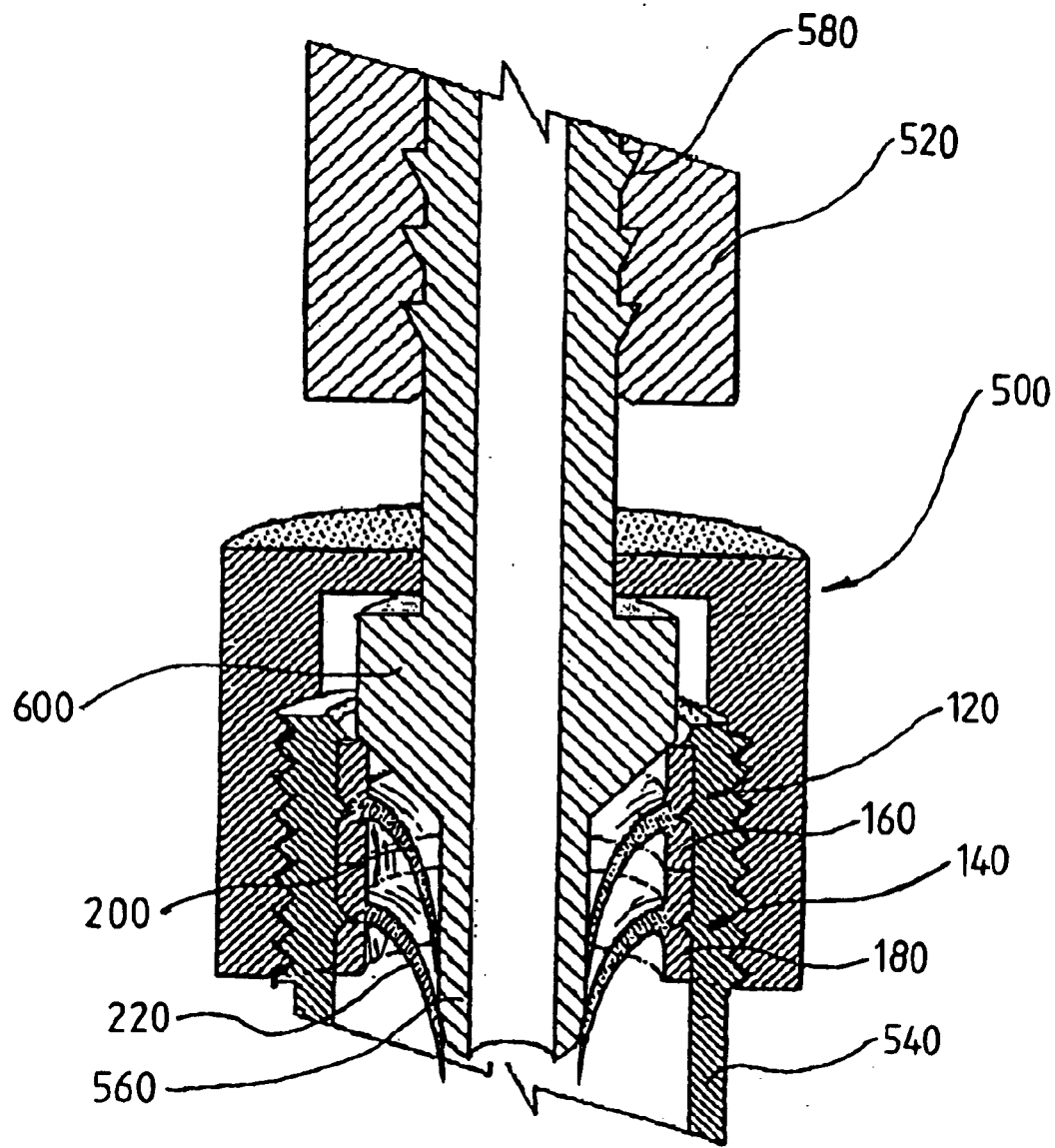

FIGS. 11A to 11C illustrate another embodiment of this aspect of a non-return valve according to the invention which is designed to be incorporated in a quick connect coupling shown generally as 500 of a hydraulic line or hose 520. The hydraulic coupling 500 is designed to threadably engage a valve casing 540 in which this embodiment of the non-return valve 100 is mounted.

In this application the valve diaphragms 200 and 220 are actuated not by fluid pressure but rather via a fluid nozzle which is in the form of a fluid injector 560 connected to the hydraulic hose 520 via barbs 580 formed about a periphery of the injector 560. FIGS. 11A to 11C show the sequential steps involved in connecting the quick coupling 500 to the casing 540. The injector coupling 500 is initially slid longitudinally along the injector 560 until it abuts an annular flange 600 formed about the injector 560. The injector 560 is then pressed into engagement with the diaphragms 200 and 220 so as to expose their corresponding collapsible apertures or slits 240 and 260. The coupling 500 is progressively threaded onto the casing 540 so as to drive the injector 560 into engagement with the diaphragms 200 and 220. Thus, in this example, hydraulic fluid or the like which is contained in the casing 540 and any associated plumbing is allowed to flow to the flexible hose 520 upon connection of the quick coupling 500. The nozzle 560 thus serves as the means for actuating the valve 100 of this particular aspect of the invention.

Figure 12:
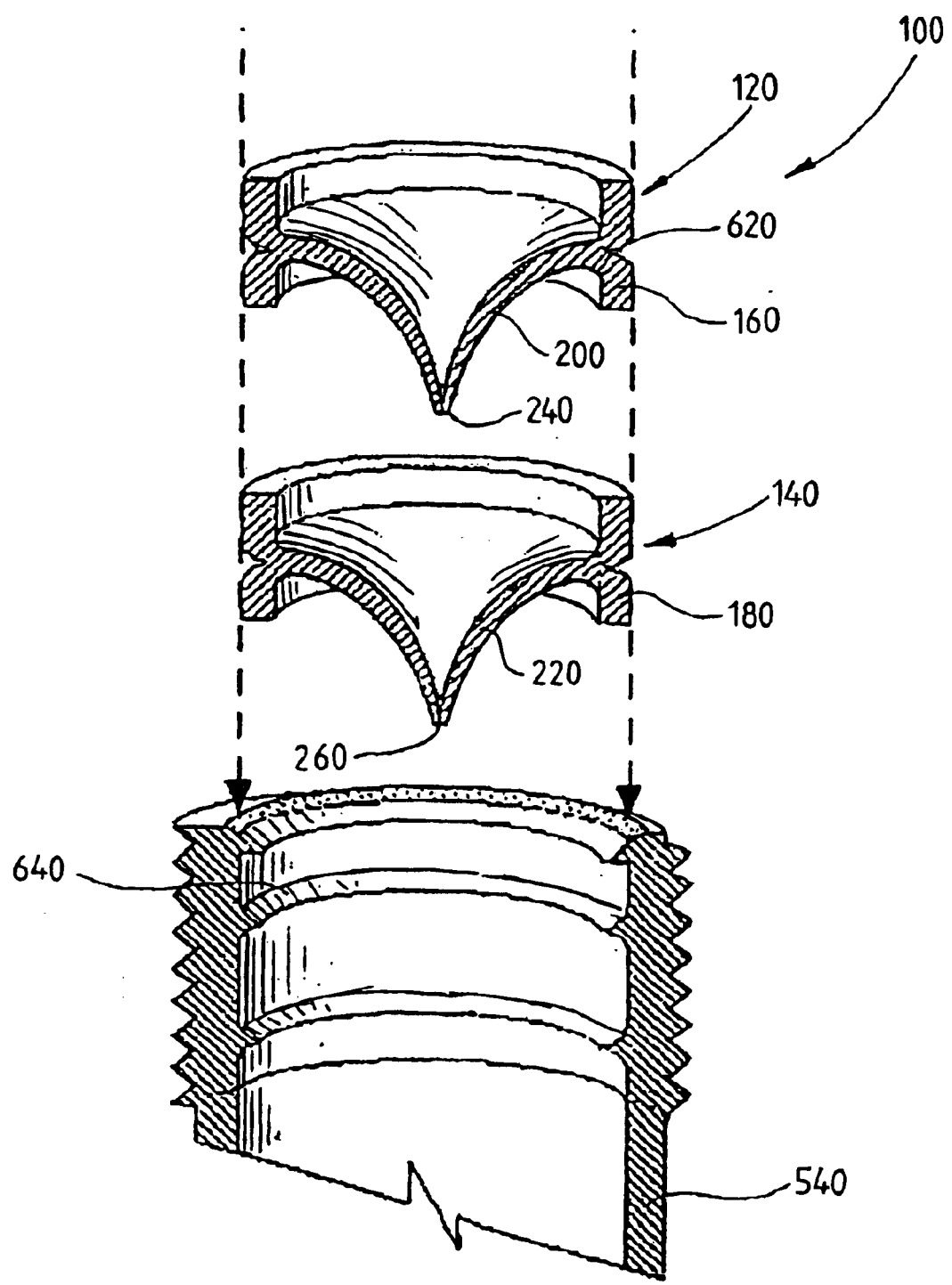
FIG. 12 is an exploded sectional view of various components of the non-return valve of FIGS. 11A to 11C.

FIG. 12 illustrates an exploded sectional view of the valve 100 incorporated in the quick connect hydraulic coupling described. Each of the valve bodies 120 and 140 is designed to coaxially press-fit within the casing 540. Each body 120 and 140 includes an annular recess 620 being shaped complementary to and designed to be engaged by a corresponding ridge 640 formed circumferentially within an inner surface of the casing 540.

In the preceding embodiments of the invention the apex of the conical-shaped diaphragm such as 14 is orientated in a downstream flow direction and directed toward a high pressure side of the valve. The diaphragm such as 14 is of the conical shape and constructed of a resiliently flexible material wherein the diaphragm itself initiates closure of the collapsible aperture or slit such as 22. The high pressure fluid on the upstream side of the diaphragm such as 14 then further promotes closure and sealing of the collapsible aperture or slit such as 22 to prevent fluid flowing in a reverse direction toward the inlet. To open the non-return valve such as 10 pressure, exceeding atmospheric pressure and that on the high pressure side, is applied to an inlet side of the diaphragm such as 14 to deflect the diaphragm 14 to expose the collapsible aperture or slit 22. The non-return valve such as 10 is then in the open position whereupon fluid is allowed to flow through the valve such as 10 from the inlet 18 to the outlet 20 only.

Figure 13:
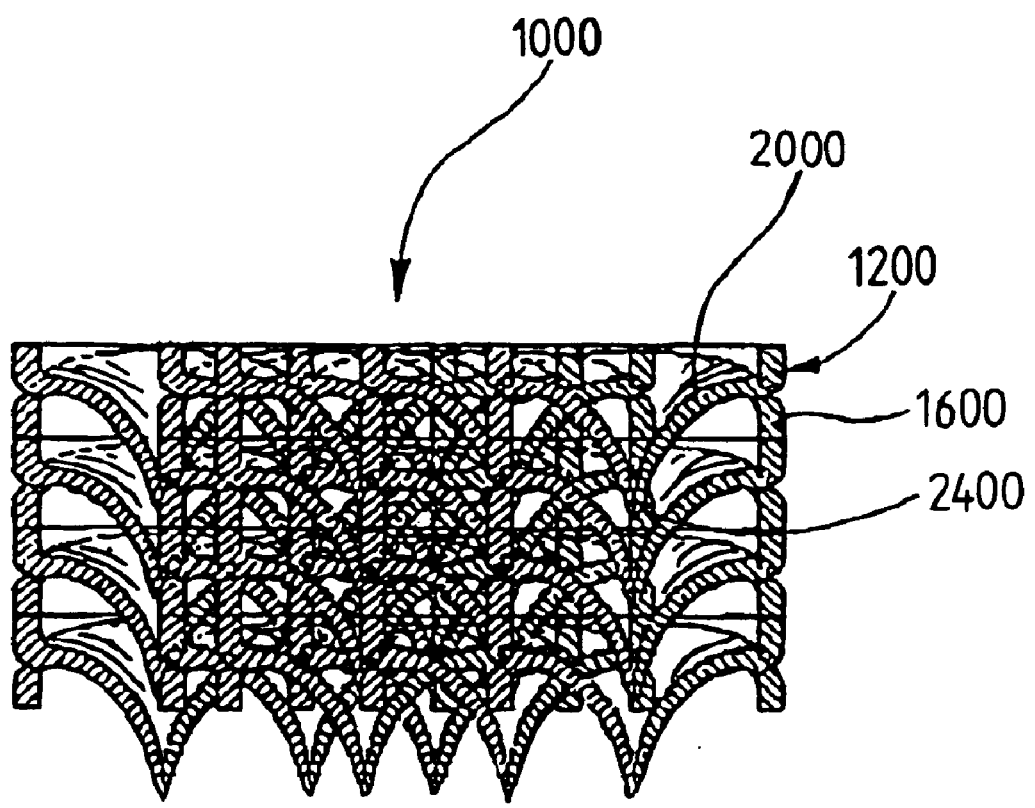
FIG. 13 is a sectional representation of a membrane according to a further aspect of the invention being permeable in one direction only.

FIG. 13 depicts one example of a membrane 1000 of a further aspect of the invention. The membrane 1000 is permeable in one direction only and on a microscopic scale may be applied as a means of repairing a lung. In order to avoid repetition and for ease of reference like components as compared to the valve of FIGS. 2 to 5 have been designated with an additional "00". The membrane 1000 is multi-layered with a series of panels or blankets of collapsible diaphragms such as 1400 being formed alongside one another. In this embodiment each of the diaphragms such as 1400 includes a corresponding valve body 1200 which is formed integral with an adjacent valve body of an adjacent diaphragm. However, it should be appreciated that the membrane 1000 need not include this arrangement of valve bodies but rather may be limited to a panel or blanket of interconnected collapsible diaphragms. In any case the membrane 1000 functions along the same lines as the non-return valve 10 or 100 described above. That is, pressure imposed on an upstream side of the membrane 1000 deflects one or more of the diaphragms such as 1400 to expose its corresponding aperture or slit 2200 to allow fluid to flow across the membrane 1000. On the other hand, without a positive pressure imposed on the upstream side of the membrane 1000, the diaphragms such as 1400 are in a collapsed condition such that the collapsible apertures or slits such as 2200 are closed to prevent the flow of fluid in a reverse direction across the membrane 1000.

Figure 14:
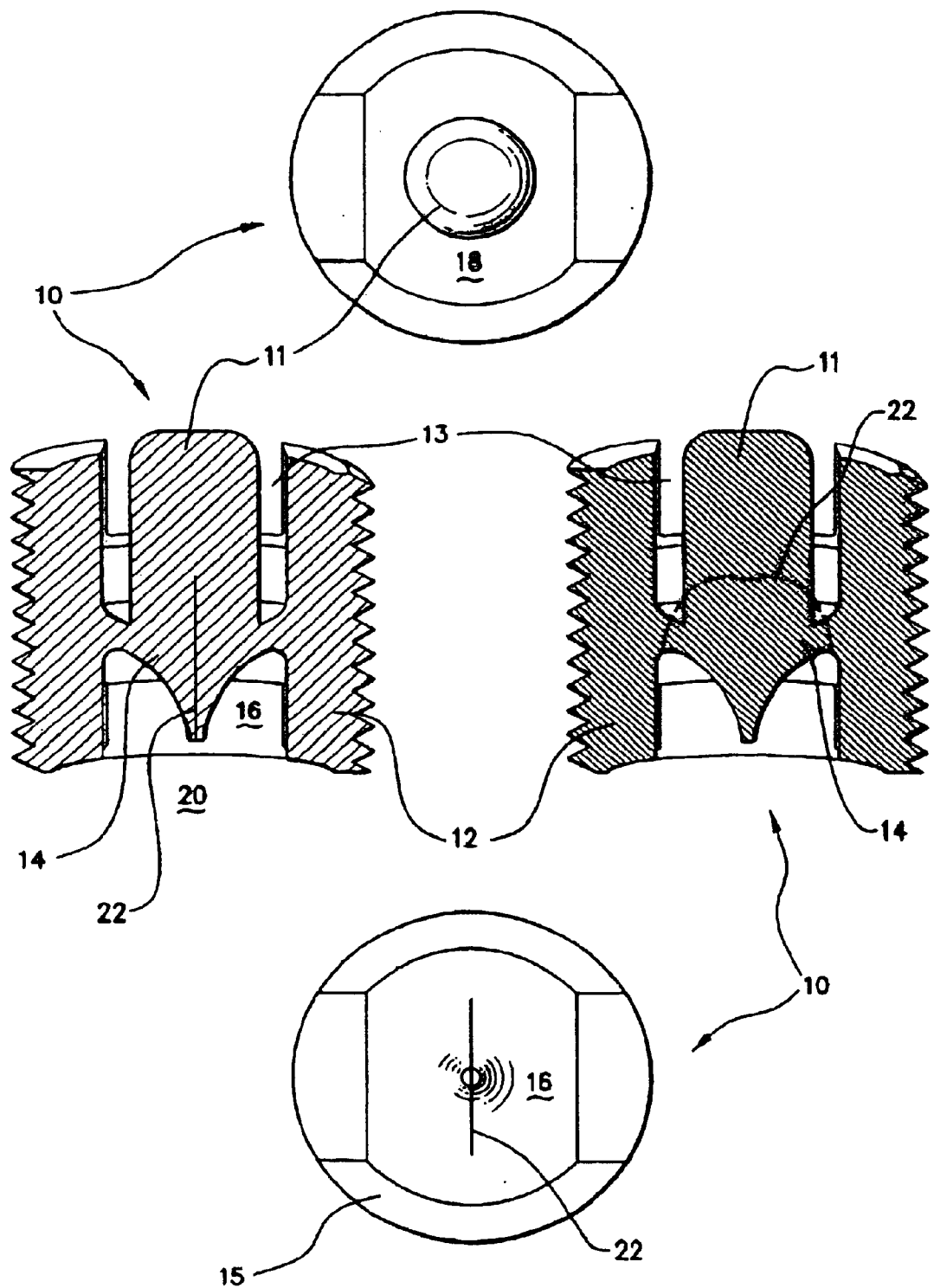
FIG. 14 is plan and sectional profile views of a non-return valve according to one embodiment of yet a further aspect of the invention.

FIG. 14 shows sectional and plan views of a non-return valve according to yet a further aspect of the invention. In order to avoid repetition and for ease of reference like components of this non-return valve as compared to that of FIGS. 2 to 5 have been designated with the same reference numerals. For example, the non-return valve has been designated generally as 10 and the valve body 12. In this example the non-return valve 10 includes a detent 11 formed integral with and extending in an upstream direction from the valve diaphragm 14. The collapsible aperture 22 is formed as a slit which intersects with the apex of the conical-shaped diaphragm 14 and extends approximately midway into the length of the detent 11. The collapsible slit 22 extends across an annular gap 13 defined between the valve body 22 and the detent 11. The collapsible slit 22 of this example is substantially co-planar with an axis of the valve 10 and the detent 11.

The valve body 12 includes a pair of opposing step rebates such as 15 which are adapted to receive a tool for screw threaded removal or insertion of the non-return valve 10. In operation, depression of the detent 11 forces the diaphragm 14 apart and the collapsible slit 22 open so as to either purge fluid from the non-return valve 10 or permit the flow of fluid across the valve 10 in a downstream direction. The detent 11 provides added rigidity to the diaphragm 14 whilst in use and should be more suited to moulding than the described embodiments of the non-return valve.

Figure 15:
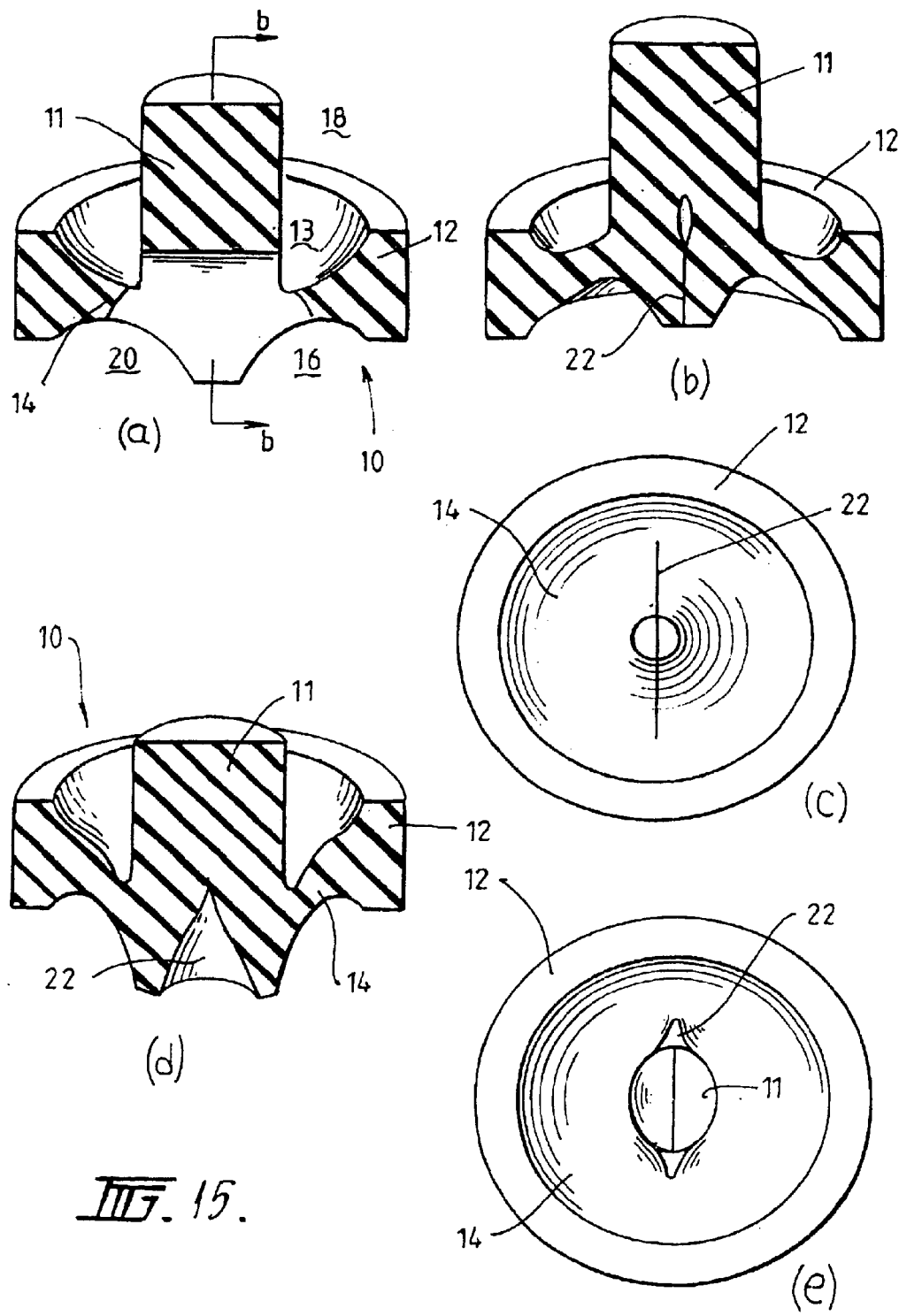
FIGS. 15A to 15B are various plan and sectional views of another embodiment of this aspect of the invention shown in both open and closed/pressurised configurations.
Figure 16:
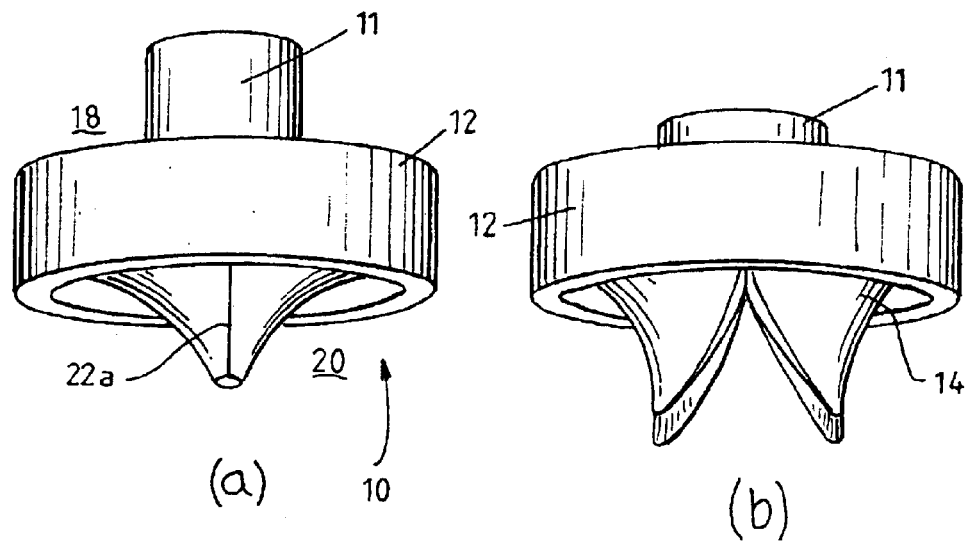
FIGS. 16A to 16D are various underside perspective, sectional and plan views of a variant of the non-return valve of FIG. 15 in its closed and open configurations.
Figure 16:
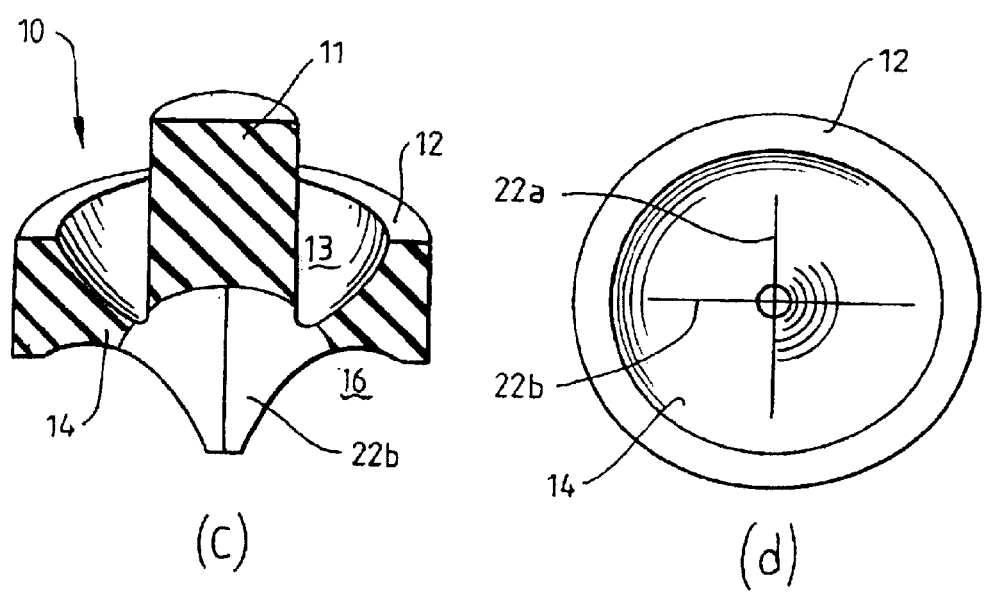

FIGS. 15 and 16 illustrate a variant of the non-return valve of FIG. 14. In order to avoid repetition and for ease of reference like components of this non-return valve as compared to that of FIG. 14 have been designated with the same reference numerals. The non-return valves 10 of these variants include a thicker walled diaphragm 14 at the annular gap 13 between the valve body 22 and the detent 11. Otherwise, the non-return valve 10 of FIGS. 14 and 15 are similar in construction and of a single slit 22 configuration. On the other hand, the non-return valve of FIG. 16 includes a pair of slits 22a and 22b disposed at right angles to one another whilst being co-planar with an axis of the valve 10. The dual slits 22a/b of this example permits increased flow of fluid through the valve 10 particularly in its exhausting or purging condition.

FIGS. 15A and C depict the valve 10 in its neutral/closed condition. In this condition the resilience of the diaphragm 14 together with the fluid pressure on the high pressure side of the valve 10 effects closure of the collapsible aperture or slit 22. FIG. 15B shows the valve 10 in an over pressured condition at around 2000 kPa. The single slit 22 is drawn slightly open in its upper region by the tension exerted by the stressed diaphragm 14. Continued opening of the single slit 22 under excessive pressure vents sufficient fluid until the pressure returns to normal operating conditions and the valve reverts to its neutral/closed condition illustrated in FIGS. 15A and C. The non-return valve 10 shown in FIGS. 15D and E is in an opened condition wherein the slit aperture 22 is exposed to permit the flow of fluid from the high pressure side of the valve 10. The slit 22 is exposed by depressing the valve actuator or in this example detent 11 axially downward toward the high pressure side of the valve 10. The tension in the diaphragm 14 by depression of the detent 11 urges opening of the slit aperture 22.

FIGS. 16A and C are perspective and sectional views of the dual slit variant of the non-return valve 10. The valve 10 is in these representations shown in its neutral/closed condition whereby fluid is prevented from flowing from a high to a low pressure side of the valve 10. FIG. 16D is an underside plan view of the non-return valve 10 in this closed condition wherein the dual slits 22a/b are sealed together under the effect of both the resilient force of the diaphragm 14 and the pressure of the fluid on the high pressure side of the valve 10. FIG. 16B illustrates this dual-slit version of the valve 10 in its open condition wherein the dual slit aperture 22a/b is exposed to permit the flow of fluid in a reverse direction through the valve. The detent 11 is depressed axially toward the high pressure side of the valve 10 so that the valve 10 assumes this opened condition. It will be appreciated that the tension in the diaphragm 14 draws the dual slit apertures 22a/b apart as best represented in FIG. 16B.

Figure 17:
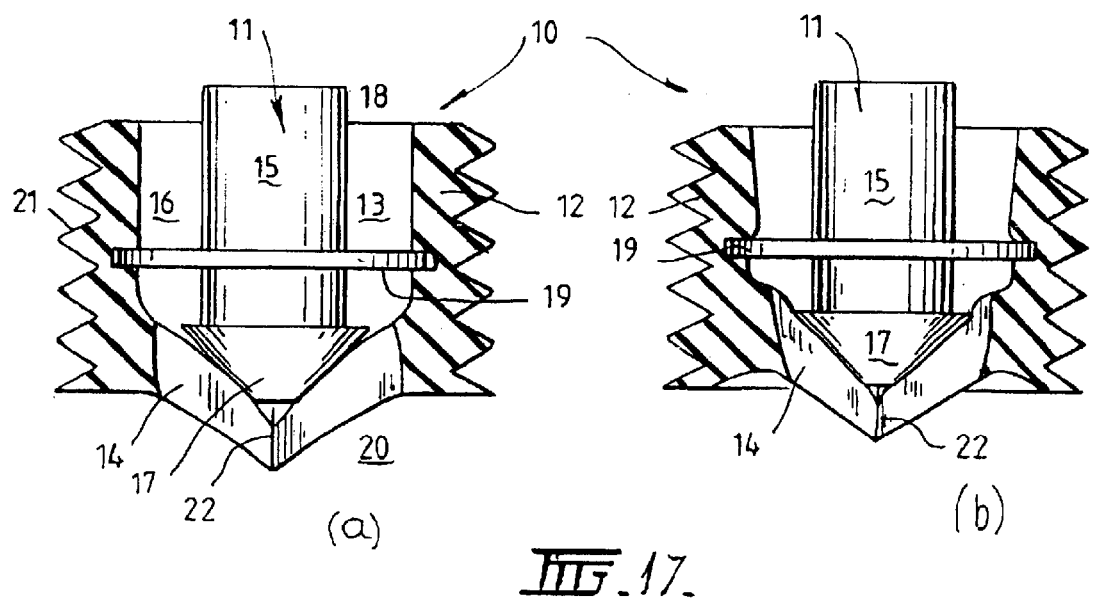
FIGS. 17A and 17B are part sectional views of a further embodiment of the preceding aspect of the non-return valve in its "neutral" and pressurised configurations.
Figure 18:
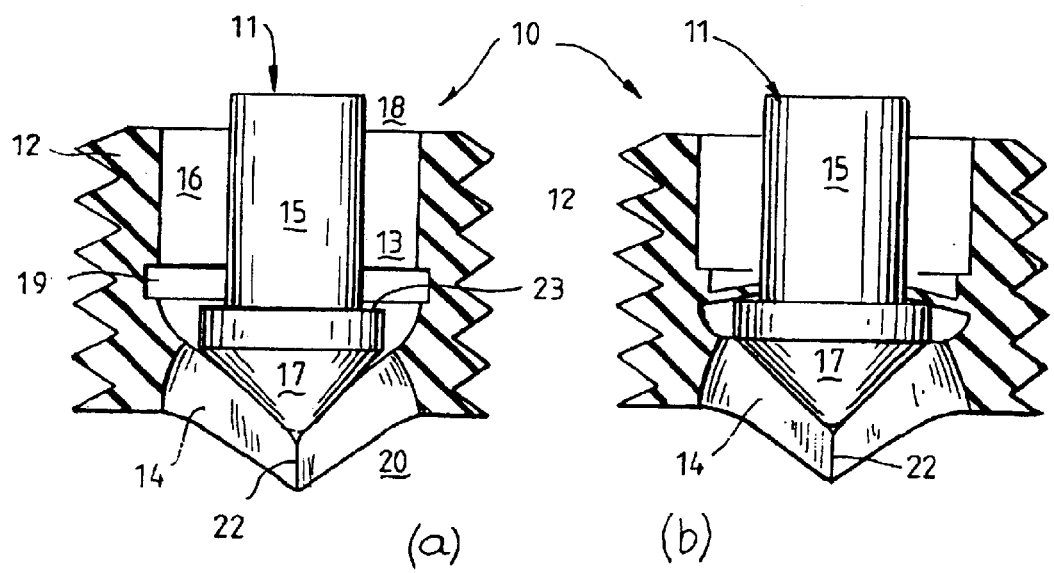
FIGS. 18A and 18B are part sectional views of still another embodiment of this aspect of the non-return valve in its "neutral" and pressurised configurations.

FIGS. 17 and 18 illustrate alternative embodiments of the preceding aspect of the non-return valve 10 including an actuator in the form of the detent 11. In these alternative embodiments the detent assembly 11 is fabricated separate from the remainder of the valve 10. The detent assembly 11 of FIG. 17 includes an elongate member 15 having at one end a conical-shaped engaging surface 17 being configured to abut the diaphragm 14 at its inlet side. The detent assembly 11 includes a retaining element or ring 19 fixed to or formed integral with the elongate member 15 and being adapted to engage an annular recess 21 formed in an inner wall of the valve body 12. The detent assembly 11 is retractably inserted into the valve body 12 prior to, in this example, its screw threaded installation. FIG. 17A shows the non-return valve under 0 differential pressure across the valve diaphragm 14 whereas FIG. 17B schematically depicts the valve 10 with a relatively high pressure of around 1000 kPa exerted on the high pressure side of the valve 10.

FIG. 18 illustrates a non-return valve 10 similar in construction to that of FIG. 17 but wherein the detent assembly 11 includes the elongate actuator member 15 axially and slidably received within the retaining element 19 which is retractably received within the valve body 12. In this example the conical-end of the actuator member 15 includes a shoulder 23 which abuts the retaining element or ring 19. FIG. 18A shows this variant of the valve 10 with approximately 0 differential across the valve diaphragm 14 whereas FIG. 18B shows a pressurised condition at around 2000 kPa on the high pressure side of the valve 10. The retaining ring 19 is designed to deflect under this pressurised condition whilst the diaphragm 14 bears against the conical-shaped engaging surface 17 of the detent assembly 11.

Figure 19:
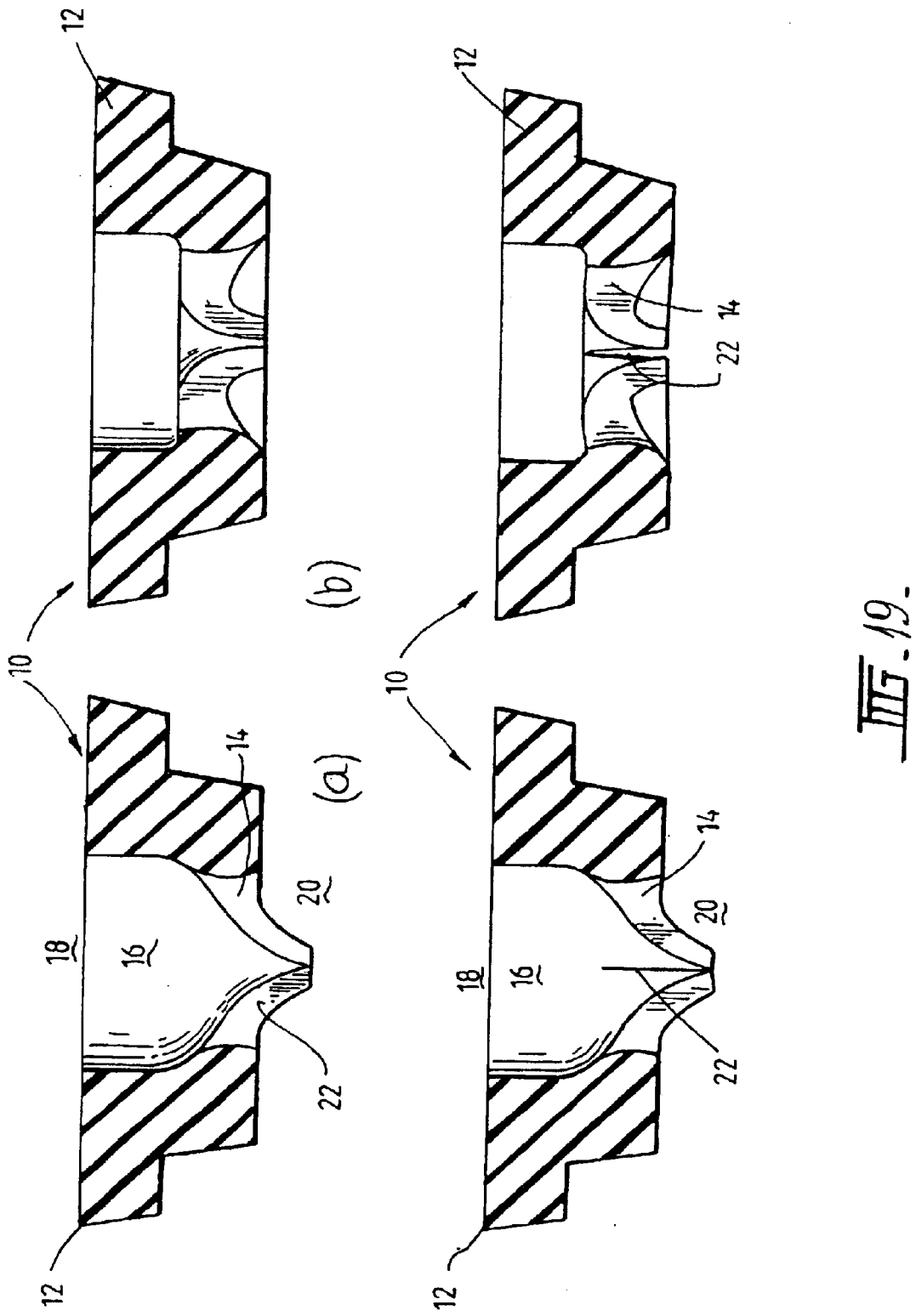
FIGS. 19A to 19D are sectional views of a pressure relief valve of still another aspect of the invention shown in its various working configurations.

FIG. 19 depicts various sectional views of a pressure relief valve 10 according to another aspect of the invention. The pressure relief valve is essentially low profile or squat and a heavy walled version of the previously described non-return valve. Similar components/features of this pressure relief valve 10 have been designated with the same reference numeral as the corresponding feature of the non-return valve. The pressure relief valve 10 of FIGS. 19A and B is of a single slit configuration whereas the valve 10 of FIGS. 19C and D are fabricated in a dual slit configuration. FIGS. 19A and C show the pressure relief valves 10 in a relaxed condition at 0 differential pressure across the diaphragm whereas FIGS. 19B and D depict the valve 10 venting at an excess pressure of around 440 kPa. The pressure relief valve 10 is designed so that an axial deflection of the diaphragm 14 toward the inlet side of the valve 10 effects partial exposure of the collapsible slits 22 to vent excessive pressure on the high pressure side of the valve 10. The resilient forces exerted by the conical-shaped diaphragm 14 thereafter draws the diaphragm 14 towards its passive or neutral condition as depicted in FIGS. 19A and C. The pressure relief valve 10 can thus be designed, for example by material selection and/or configuration of the conical diaphragm, to vent or release pressure at a predetermined value.

Figure 20:
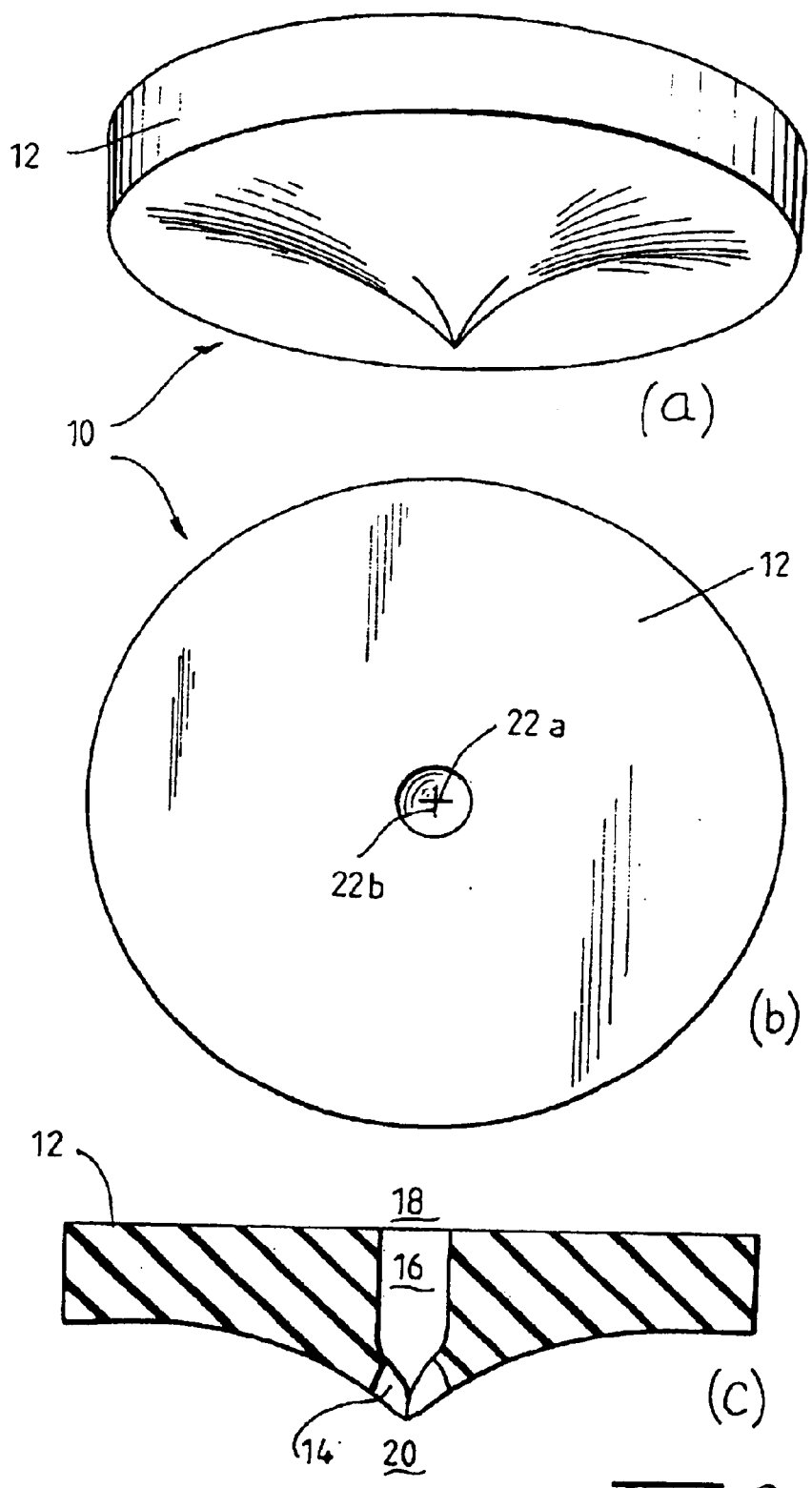
FIGS. 20A to 20C are perspective plan and sectional views of a high pressure non-return valve according to yet another aspect of the invention.

FIG. 20 shows a high pressure non-return valve 10 according to yet another aspect of the invention. The non-return valve 10 of this embodiment is configured for relatively high pressure applications such as those exceeding 400 kPa, for example this valve 10 has application in a sports ball. The valve 10 is still of the same general construction as that of the previous embodiments except that it is relatively squat in sectional profile and includes a relatively small diameter fluid passageway 16. The ball valve 10 of this example includes a conical-shaped diaphragm 14 of a dual slit 22a/b configuration. The applicant conducted pressure testing on a prototype of the high pressure non-return valve 10. In these tests the valve 10 maintained a pressure of 425 kPa for 1100 hours. These actual tests were consistent with and validated data obtained from computational modelling performed on a corresponding valve.

Figure 21:
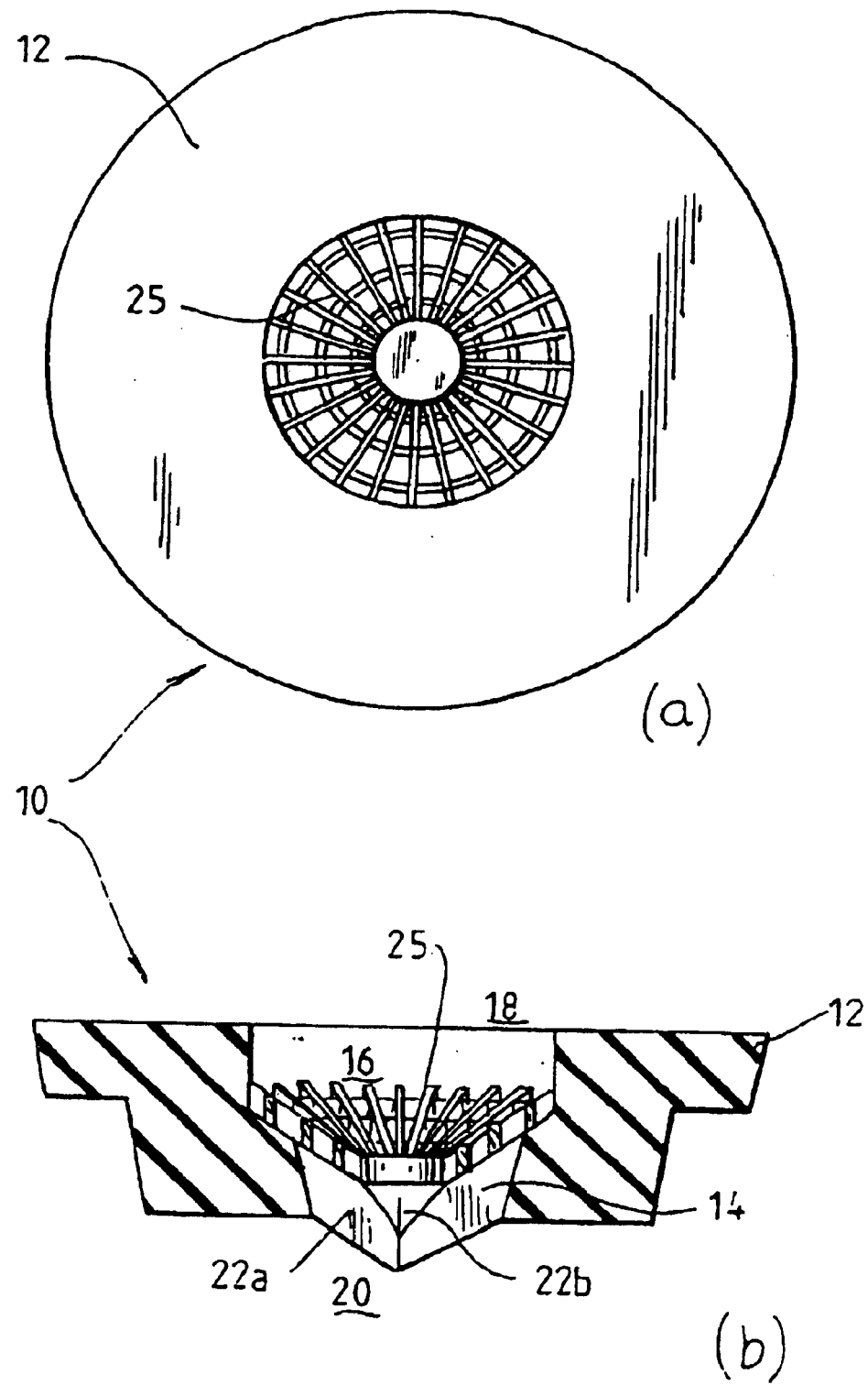
FIGS. 21A and B are plan and sectional views of a variant of the high pressure non-return valve of FIG. 20.

FIG. 21 depicts a high pressure non-return valve which is similar in construction to the pressure relief valve 10 of FIG. 19 except that it is not designed for venting. The non-return valve 10 is of the dual slit 22a/b configuration and includes a reinforcing member in the form of a conical-shaped cage 25. The cage 25 is shaped generally complementary to an inlet aide of the diaphragm 14 and is press-fit within the valve body 12 on an inlet yside of the diaphragm 14. The reinforcing member or cage 25 includes an innermost ring-shaped member connected to a series of larger diameter and coaxially disposed ring members via radially extending spokes. The innermost ring member is sized to permit the passage of a nozzle or the like for purging or filling via the valve 10. The reinforcing member 25 is designed to support the valve diaphragm 14 so that increased pressure can be applied to its high pressure side without inversion of the diaphragm 14.

Now that several preferred embodiments of the various aspects of the present invention have been described in some detail it will be apparent to those skilled in the art that the non-return valve, pressure relief valve and permeable membrane have at least the following advantages:
  i) the non-return and pressure relief valves are relatively simple in construction;
  ii) the non-return valve is effective in operation relying on fluid pressure for opening, and valve membrane characteristics and design for closure; and
  iii) the non-return and pressure relief valves are relatively inexpensive to manufacture.

Those skilled in the art will appreciate that the invention described herein is susceptible to variations and modifications other than those specifically described. For example, injection moulding is merely one exemplary technique of forming the non-return valves. The diaphragm may be constructed of practically any resiliently flexible material which in a collapsed condition obstructs the collapsible aperture to prevent flow across the valve or membrane. The non-return valves may extend to applications other than those described above. For example, the fail-safe non-return valve may be connected across the skin of a ship's hull and provide a means of quick evacuation where the human body can slip through dual or multiple diaphragm valves.

All such variations and modifications are to be considered within the scope of the present invention the nature of which is to be determined from the foregoing description.

What is claimed is:
1. A non-return valve comprising:
  a valve body including a fluid passageway which defines a fluid inlet and a fluid outlet, the fluid passageway being adapted to allow a flow of fluid from the inlet to the outlet;

a valve diaphragm being connected across the fluid passage and including a collapsible aperture, said diaphragm being constructed of a resiliently flexible material and being configured wherein the diaphragm initiates closure of the collapsible aperture to prevent fluid flowing in a reverse direction toward the inlet; and a valve actuator connected to the diaphragm and being configured wherein axial movement of the actuator toward the fluid outlet deflects the diaphragm to expose the aperture and allow fluid to flow through the passageway from the inlet to the outlet only, the diaphragm being in the form of a generally conical-shaped diaphragm having the collapsible aperture located at or adjacent its apex which is orientated in a downstream flow direction.

2. A non-return valve as defined in claim 1 wherein the valve actuator includes an elongate member formed integral and generally coaxial with the conical-shaped valve diagram.

3. A non-return valve as defined in claim 1 wherein the valve actuator includes an elongate member having at one end an engaging surface being configure to abut the diaphragm at its inlet side.

4. A non-return valve as defined in claim 3 wherein the valve actuator also includes a retaining element coupled to the elongate member and configured to operatively engage the valve body to inhibit axial displacement of the elongate member and its engaging surface and thus deflection of the diaphragm under pressure.

5. A non-return valve as defined in claim 1 wherein the collapsible aperture is in the form of one or more slits each being formed through an axis of the valve.

6. A high pressure non-return valve as defined in claim 1 wherein said conical-shaped diaphragm has a longitudinal axis passing through said apex and is rotationally symmetrical about said longitudinal axis.

* * * * *

UNITED STATES PATENT AND TRADEMARK OFFICE
CERTIFICATE OF CORRECTION

PATENT NO. : 6,824,117 B2
DATED : November 30, 2004
INVENTOR(S) : Horton

It is certified that error appears in the above-identified patent and that said Letters Patent is hereby corrected as shown below:

<u>Title page,</u>
Item [63], Related U.S. Application Data, "Dec. 14, 2000" should read
-- June 14, 2000 --.

Signed and Sealed this

Fifth Day of April, 2005

JON W. DUDAS
*Director of the United States Patent and Trademark Office*